US012605578B2

(12) United States Patent
Head

(10) Patent No.: US 12,605,578 B2
(45) Date of Patent: Apr. 21, 2026

(54) BEAM FOR TRANSPORTING TO REMOTE LOCATIONS

(71) Applicant: A & P Technology, Inc.

(72) Inventor: Andrew Head, Cincinatti, OH (US)

( * ) Notice: Subject to any disclaimer, the term of this patent is extended or adjusted under 35 U.S.C. 154(b) by 0 days.

(21) Appl. No.: 16/194,159

(22) Filed: Nov. 16, 2018

(65) Prior Publication Data

US 2019/0160315 A1 May 30, 2019

Related U.S. Application Data

(60) Provisional application No. 62/588,094, filed on Nov. 17, 2017.

(51) Int. Cl.
| | |
|---|---|
| *A62C 33/04* | (2006.01) |
| *F16L 11/02* | (2006.01) |
| *F16L 11/10* | (2006.01) |
| *A62C 3/02* | (2006.01) |
| *A62C 29/00* | (2006.01) |
| *B64U 101/47* | (2023.01) |

(52) U.S. Cl.
CPC .............. *A62C 33/04* (2013.01); *F16L 11/02* (2013.01); *F16L 11/10* (2013.01); *A62C 3/0242* (2013.01); *A62C 29/00* (2013.01); *B64U 2101/47* (2023.01)

(58) Field of Classification Search
CPC ...... A62C 3/0228; A62C 3/0242; B64D 1/16; B64D 1/18; B05B 13/005; B64C 39/022; B64C 39/024; B64C 2201/027; B64C 2201/12

USPC ......................................................... 239/171
See application file for complete search history.

(56) References Cited

U.S. PATENT DOCUMENTS

| | | | | | |
|---|---|---|---|---|---|
| 3,759,330 | A | * | 9/1973 | Rainey ..................... | B64D 1/16 |
| | | | | | 169/53 |
| 5,421,128 | A | * | 6/1995 | Sharpless .................. | E04C 3/46 |
| | | | | | 52/2.13 |
| 5,497,633 | A | * | 3/1996 | Jones ..................... | B05B 7/0075 |
| | | | | | 62/314 |
| 6,302,332 | B1 | * | 10/2001 | Panneton ............ | A01M 7/0014 |
| | | | | | 239/124 |
| 2010/0272915 | A1 | * | 10/2010 | Laws ...................... | B05B 16/40 |
| | | | | | 427/421.1 |
| 2012/0012673 | A1 | * | 1/2012 | Hedegaard .......... | A01M 7/0014 |
| | | | | | 239/165 |

(Continued)

*Primary Examiner* — Cody J Lieuwen
(74) *Attorney, Agent, or Firm* — FisherBroyles, LLP; Jeremy P. Sanders

(57) ABSTRACT

A system and method directed to an inflatable aerial beam transported by aerial vehicles for dispensing, among others, power and fluids using the inflatable aerial beam that may be mounted between two or more aerial vehicles. The beam, may become rigid when inflated or flexible when deflated. The beams may be coupled to one or more aerial vehicles via a pivotable joint or a flexible juncture to maintain flexibility of movement of the aerial beams. The beams may include a fluid dispenser that distributes fluid to spray nozzles to dispense fluids from the inflatable beam. The fluid, chemicals, and/or power may be obtained from a remote fixed or mobile source, one or more aerial vehicles, and other types of aerial vehicles. The aerial vehicles may be controlled remotely from a fixed location or from a movable remote-control source and may include sensors for navigation and for controlling the dispensing of the fluid or power.

21 Claims, 18 Drawing Sheets

(56)                    References Cited

U.S. PATENT DOCUMENTS

2015/0274294 A1 *  10/2015  Dahlstrom .......... B05B 13/0278
                                                            239/722
2017/0043872 A1 *   2/2017  Whitaker ................. B64D 1/18
2018/0354624 A1 *  12/2018  Liu .......................... B64D 1/18

* cited by examiner

BEAM FOR TRANSPORTING TO REMOTE LOCATIONS

CROSS-REFERENCE TO RELATED APPLICATIONS

This application claims priority to U.S. Provisional Patent Application No. 62/588,094, filed Nov. 17, 2017, the contents of which are incorporated herein, in its entirety, by reference.

BACKGROUND

Manned and unmanned aerial vehicles invariably may carry their own power source, such as a battery or liquid fuel. The reasons for this may include having an aerial vehicle tethered to the ground may dramatically limit the mission profile, and the fuel or power line may become unwieldly, if not heavy, as the line elongates and can become tangled or entrapped on features on the ground below the vehicle. However, untethered vehicles need to balance the weight of the power source, such as a battery or fuel, with the machinery to convert the power into lift, which may often limit the excess lift available for a payload. Particularly, for example, some untethered vehicles are limited in power source and thus are limited in the range of deployment and the duration of the mission. Further, for untethered vehicles, the machinery needs to be both light weight and powerful so that, the machinery may become expensive. Additionally, carrying a fluid dispensing system for distributing fluids over various terrain or surfaces may include many similar issues including entanglement, entrapment, and may limit the ability to dispense fluids over long distances.

SUMMARY

This drawback may be resolved by the addition of an inflatable aerial beam where the beam may include a power dispenser for an aerial vehicle that supports the beam. The advantages of an inflatable beam that supports a power and fluid dispenser for remote power include: providing a structure that supports the fluid and power dispenser while maintaining the stability of the aircraft, as well as avoiding entanglement of the fluid and power lines. The aerial beam is a flexible, as it is may be in a deflated state prior to deployment and may be inflated upon deployment. The deflated and inflated states allow for flexibility of the aerial beam system by providing ease of transport in the deflated state and providing a rigid structure for the fluid and the power dispensers to connect to. In example embodiments, the power source may be included within the beam or attached to the outside of the beam. In further example embodiments, the power dispensers may be attached to the aerial vehicle or components connected to the aerial vehicle. The inflatable aerial beam may serve as a support structure for components which support fluid dispensing with improved features. The advantages of inflatable beam that transport fluid and power to remote locations are numerous as they extend the range of aerial beam system to locations not previously accessible to fluid dispensing systems.

In example embodiments, the components may include the wires and the fluid dispensing systems, such that the wires and the fluid dispensing systems do not get entangled. The inflatable aerial beam system also may provide a mechanism to distribute the fluid in such a way that is more efficient and can spread the fluid more evenly and in a controllable manner. The inflatable aerial beam may also include a fluid source to dispense the fluid during flight on a target surface. Depending on the application of the system, there would be a sufficient number of vehicles in series spaced along the inflatable aerial beam from a grounding point to the end to maintain elevation and maneuverability of the entire series.

The present invention further includes an aerial fluid dispensing and power distributing system that utilizes Unmanned Aerial Vehicles (UAVs) and aerial beams to distribute fluid and power in a safe and efficient manner. Including a reduction in entanglement of lines to deliver the fluid or power and an improved level of control of the location and operation of the fluid dispensing based on the characteristics of the aerial beams. The UAV and inflatable aerial beam system are configured to deploy UAV(s) from a mobile command and control unit, to extinguish fires, or for other applications, from the air while remaining aloft for a predetermined and extended the entire required duration.

The present invention in some embodiments accomplishes this feat via an inflatable aerial beam that is carried by a UAV or a manned aerial vehicle. The inflatable aerial beam may carry the power and fluid either within the inflatable aerial beam or connected exterior to the inflatable aerial beam. The inflatable beam provides versatility by having an inflated and a deflated state. The inflated state allows for a rigid structure that carries the fluid and the power dispensers and provides for maintained stability of the aerial vehicles that carry it. The inflated and deflated state is controlled by the control system located on the aerial vehicle. The inflatable aerial beam system solves the issue of entanglement with the transportation of hoses or wires while in flight.

The inflatable aerial beam system also provides a more efficient fluid dispensing system that is not limited to a hose that dispenses fluid at one end. The system provides for controlled fluid dispensing that does not get entangled in flight as it is coupled to the inflatable aerial beam. Further, there is a control system that provides for control of the dispensing of the fluid as well as the navigation of the aerial vehicles with respect to the target surface. The UAV is in communication with a command and control unit that is remote from the inflatable aerial beam system. The aerial beam system supplies the aerial vehicle with electricity, which powers the at least one electric or other suitable motor designed to enable them to hover while remaining stable. The power supply not only allows the UAV to remain in the air for long periods of time as necessary to accomplish the application, but it can extend the line of aerial beams that are utilized to dispense fluid or power. Thus, the power dispenser also allows for increased range of the aerial beam system.

In one of the embodiments of the present invention, the inflatable aerial beam system transports the fluid, which travels up a hose within the inflatable aerial beam, and escapes at a high velocity onto the fire from a nozzle, that is, in one embodiment, affixed to the UAV itself. The present invention, in another embodiment, employs at least one gyroscope within the body of the UAV to maintain stability in the air while projecting water onto the target surface. It is envisioned that multiple types of high-pressure hoses can be adapted to function effectively with the inflatable aerial beam system (1) of the UAV (2).

In an alternative embodiment, the beam system of the present invention includes a power dispenser and a remote power receiver. The beam system includes an inflatable beam that is coupled with the power source. The power dispenser is connected to the aerial vehicle through a cable
or hose. The cable or hose carries electricity or liquid fuel.
The cable or hose is coupled with the inflatable beam
through any known attachment type connection such as a
clamp, screws, adhesive, and other attachments. The elec-
tricity or fuel dispenser or power supply is carried by the
aerial vehicles and can be distributed to a remote location.

BRIEF DESCRIPTION OF THE DRAWINGS

The detailed description is described with reference to the
accompanying figures. In the figures, the left-most digit(s) of
a reference number identifies the figure in which the refer-
ence number first appears. The same reference numbers in
different figures indicate similar or identical items.

DETAILED DESCRIPTION

Figure 1:
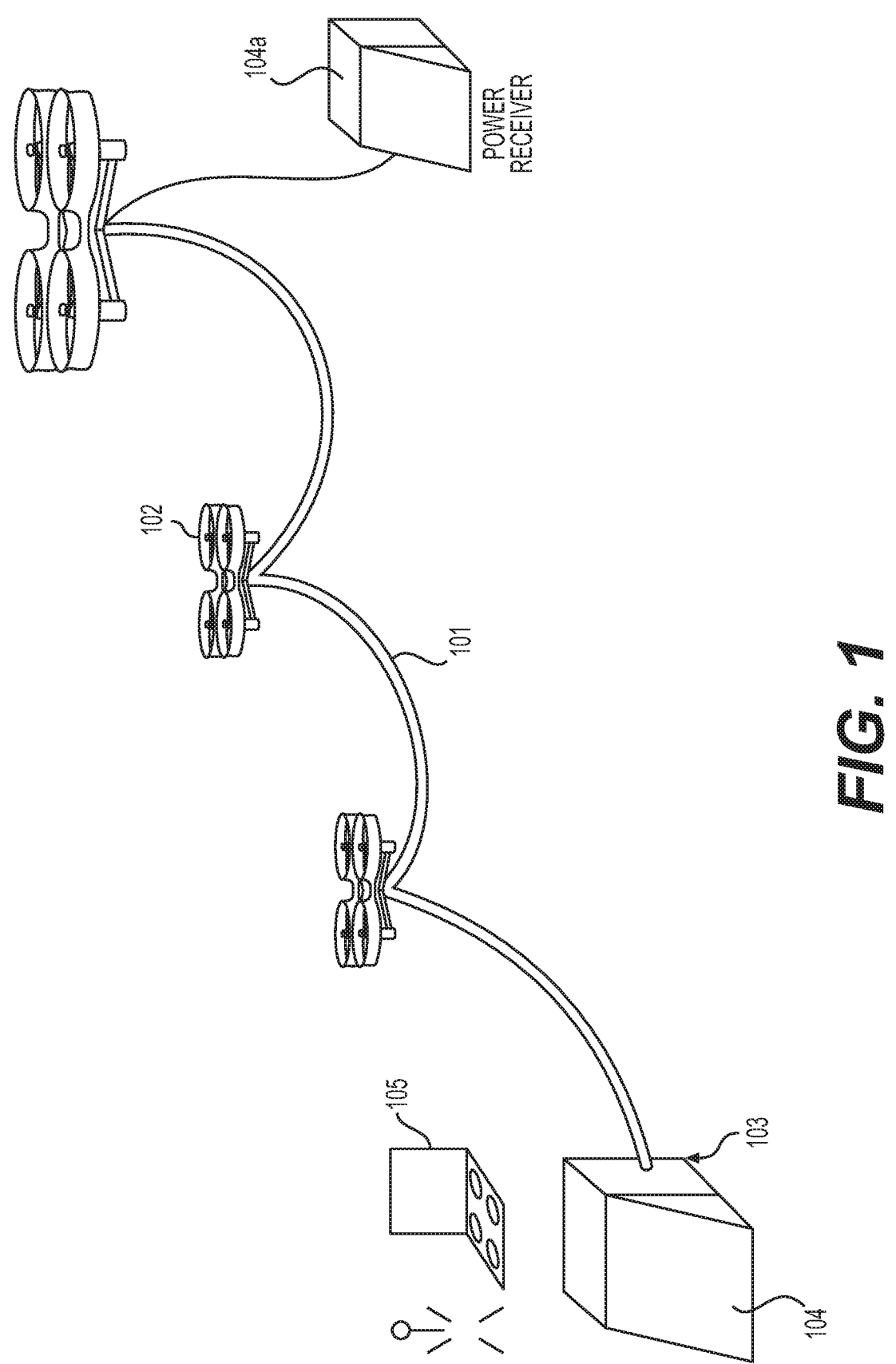
FIG. 1 is a schematic diagram of an illustrative environ-
ment that includes an aerial vehicle, a remote computer
controller, a fluid and power distributer, an inflatable beam
that carries the fluid and power dispensers and a power
receiver, according to example embodiments of the disclo-
sure.

A system of utilizing an inflatable aerial beam that is
transported by aerial vehicles including UAVs. The system
may transmit power and fluids within the inflatable aerial
beam, as well as external to the inflatable aerial beam. The inflatable aerial beam may be inflatable, including being
inflated upon deployment and deflated on command. The
aerial beam may be inflated with a compressed gas, such as
compressed air, nitrogen, helium, or other gas, pressurized
or non-pressurized liquids or the like. A method may include
the use of the UAVs to remotely transfer the beam and
dispense fluids such as fire extinguishing fluids, crop dusting
chemicals, and other type of fluids and/or chemicals depend-
ing on the usage. The aerial beams may be mounted between
two or more of the aerial vehicles. The beam may also be
mounted on a single aerial vehicle. The beams have a
predetermined length and may be inflated and deflated as
needed. Upon inflation, the beam may be rigid. The beams
may be coupled with one or more UAVs via a pivotable joint
or a flexible juncture, to maintain flexibility of movement of
the aerial beams, as controlled by the UAVs. The beams may
optionally include spray nozzles to dispense the fluids from
the inflatable beam. Alternatively, fluids may be dispensed
from one or more nozzles mounted on the UAVs. The
distributer of the fluid, chemicals and/or power may be
obtained from a remote fixed or mobile source. Additionally,
in example embodiments, the dispenser of the fluid, chemi-
cals and/or power may be from one or more of the UAVs or
another type of aerial vehicle. The UAVs may be controlled
remotely from a base station or other fixed location or may
be controlled remotely by a movable remote-control source.
The UAVs may include sensors to navigate the UAVs, as
well as to control the dispensing of the fluid and/or chemi-
cals. In example embodiments, an aspect of the invention is
that the aerial vehicle may be a manned aerial vehicle, such
as a helicopter or airplane.

In one example embodiment, the aerial beam system may
include an aerial vehicle with a main body to which the
motor(s) may be affixed. The motors may be preferably
located within a housing within the aerial vehicle. In other
embodiments the motors may be on the outside of the
vehicle. The motor(s) may be electric, but also may be any
other suitable type motor that powers the UAV. In one
embodiment, the avionics of the aerial vehicle include a
gyroscope to maintain the stability of the aerial vehicle.
Preferably the gyroscope is housed within the body of the
present invention. The present invention is equipped with
preferably at least four independent rotors, each driven by a
conventional electric motor. While in one embodiment, the
UAV may include four rotors it is understood that the UAV
may have one or more rotors depending on the application
of the inflatable beam system and the requirements needed
to execute the operation. The blades of the rotors may be
driven by electric motor(s) or may be fixed in rotation.
However, it can be envisioned in additional embodiments
that the rotors themselves may rotate independently to adjust
the thrust of each rotor assembly slightly. This could be
prudent in situations with variable winds, which may make
it difficult for the controller to effectively pilot the UAV.

The present invention in example embodiments may
include the use of a remote command and control unit,
which may provide an outlet for controlling the various
operations of the present invention. In one of the preferred
embodiments the command and control unit may be located
on a conventional fire truck. Such that the deployment of
hard to reach remote locations can be reached through the
aerial inflatable beam system of the present invention. The
remote command station may be a fire truck or any other
suitable station that is either stationary or mobile. The
command and control unit may be remote from the water
distributer. The inflatable aerial beam system may be
remotely controlled through a computer from any location utilizing common communication mediums such as internet, phone or other communication system or service and the stationary or mobile platform may be the launching and docking point for the present invention.

Similarly, the command and control unit preferably serve as a housing, docking station and/or storage facility for the UAVs. The command and control unit can house the UAVs and the UAVs can, in a preferred embodiment, be stored with the inflatable beam in a stacked formation. The UAVs optionally include docking connectors on each aerial vehicle. While docking into the stacked formation the UAVS may interlock to allow for ease of docking and mobility of the UAVs. The Inflatable aerial beam system in one embodiment is permanently affixed to the UAVS and in another embodiment the inflatable aerial beam is detachable from the UAVs. The system may also include launching bays which enable the UAVs to easily be launched at the will of the controller, operating the UAVs from within the command and control unit on the ground, or similarly, via remote control.

The inflatable aerial beam system includes at least one or more of the aerial vehicles to carry the inflatable aerial beams. The inflatable aerial beam system includes a connection between the aerial vehicles. The connections are, in a preferred embodiment, connected with a coupling structure that is on each of the aerial vehicles. The coupling structures are preferably pivotably connected to the inflatable aerial beam(s) on at least one end of the inflatable aerial beam and optionally are pivotably connected at the end on the other aerial vehicle.

The control system of the aerial vehicles controls the inflatable aerial beam to adjust the beam independent of the flight of the aerial beam and controls the pivots and maneuvering of the inflatable aerial beam. The control system provides for stability of the aircraft and stability and efficiency of the deployment of fluid or power with the aerial vehicles.

The inflatable aerial beam system does not limit the number of inflatable aerial beams that are utilized to provide fluid and power to a target surface. The configurations of the aerial vehicles can include many variations depending on the specific mission or target. The aerial vehicles do not need to be linear as disclosed in the preferred embodiments. The remote station and the remote water distributer can provide water and power to more than one inflatable aerial beam and thus can establish a center source with multiple aerial vehicle beam systems surrounding the center in a pivot configuration.

In one embodiment, a number of UAVs would carry a payload of at least an electric power and control cable, which would supply each UAV, as well as a water line. The water line would either deliver water (or other liquid, such as fire retardant, crop dusting chemical or any other fluid for other types of applications) to the far end for fire suppression activity or would distribute fluid along its length for agricultural or industrial purposes.

For forest fire suppression, in one embodiment, a pump would be placed at an appropriate water distributer. The pump would convey water through a hose or pipe and distribute to a fluid delivery system. Such a fluid delivery system would pump fluid from a ground distributer and transport the fluid via a hose or the like to connection system. The fluid delivery system is attached either internally or externally of the aerial beam. The fluid delivery system, such as a high-pressure hose or the like, is attached either permanently or is detachable to the inflatable aerial beam. The fluid delivery system would be carried by the UAVs. The inflatable aerial beam system includes the inflatable aerial beams that are optionally coupled via the coupling structure. The inflatable aerial beam system includes either a wire and/or a hose, as appropriate for the application that stems from a ground unit. The ground unit provides either power and/or fluid to the inflatable aerial beam system via the power or fluid delivery system. The ground unit would include a power distributer, such as a generator, battery, power-generator, gas tank, power line, and solar panel array or the like to power dispensers. The fuel tank for the generator could be set up for continuous refueling, so that the UAVs can stay aloft indefinitely. The ground unit could also include a booster pump for the water.

The ground unit includes in one embodiment, a docking station where the UAVs can dock. The UAVS include a docking connection on the UAV. Preferably, the docking connector is on the coupling structure of the UAV. The UAVs may be stacked vertically or horizontally on the docking station. The docking station may be a mobile docking and command station or a stationary docking and command station.

The UAVs would launch in series, carrying a payload of both the power cord and the water hose, flying both over trees and terrain until the lead UAV reaches the target surface, whereupon the fluid delivery system would direct fluid at the heat source.

The series may, for example, include 10 larger UAVs spaced every 528 feet to span one mile, or 528 smaller UAVs spaced every 10 feet to do the same job. The most cost-effective configuration is a function of multiple variables which would be determined by specific mission profiles. Also, these UAVs can be connected in a series to create a water delivery system significantly longer than a mile.

From this example, many additional elements become clear. One, or many of the UAVs may have cameras of various types to give an operator visibility of the fire in addition to the umbilical and the series of UAVs. Based on elevations, one or several of the UAVs may carry additional booster pumps to maintain water flow at manageable pressures. The pumps would operate on power supplied by the generator on the ground. Of course, instead of electric power, the ground unit could supply liquid fuel to internal combustion engines, compressed air, or other "fuel" to power the UAVs, pumps and other equipment, as may be desirable. Also, the lead UAV may carry a controllable nozzle unit, so that an operator on the ground can direct the liquid to the target surface. Each UAV in the series may be controlled by an operator on the ground. Or, each UAV may be preprogrammed to fly in the series, utilizing sensor suites to detect the ground and obstacles, GPS coordinates, as well as vision systems to see the target fire as well as other features for a totally autonomous system. Or, more likely, the system may be controlled by a combination of autonomous and operator controls where the operator would direct the lead UAV while the others would autonomously follow, automatically maintaining their position and elevation above obstacles given wind gusts and other challenges.

FIG. 1 is a schematic diagram of an embodiment of the fluid and power dispensing system including a computer remote control, a power distributer 104 and a fluid distributer 103. Additionally, a fluid dispenser may be coupled to the aerial vehicle 102. Optionally, the aerial vehicle includes four rotors and propellers. The system includes inflatable beam 101 that may be coupled to either the fluid or the power dispenser. Optionally, the system may include drawing fluid and power from distributer to a power or fluid dispenser coupled to the aerial vehicle. The power dispenser is connectable to the aerial beam that is detachably connected to the aerial vehicles. The fluid from the power distributer is coupled to a fluid dispenser that is adapted to aerial beam by various type of connections including clamps, ball and sockets or any other known connection devices. The power may then be distributed to the power receiver 104.

The present invention is designed to be easily controlled from the ground via a remote control 105. This remote control may be built into a terminal command station, such as at the base or interior of the command and control unit. The avionics package of the present invention is preferably outfitted to control the steering, thrust, pitch, and yaw of the aerial vehicle. All these functions can be directed to be handled automatically, directed by a wireless hand controller or, via a computer on the ground or in a remote mobile station.

Figure 2:
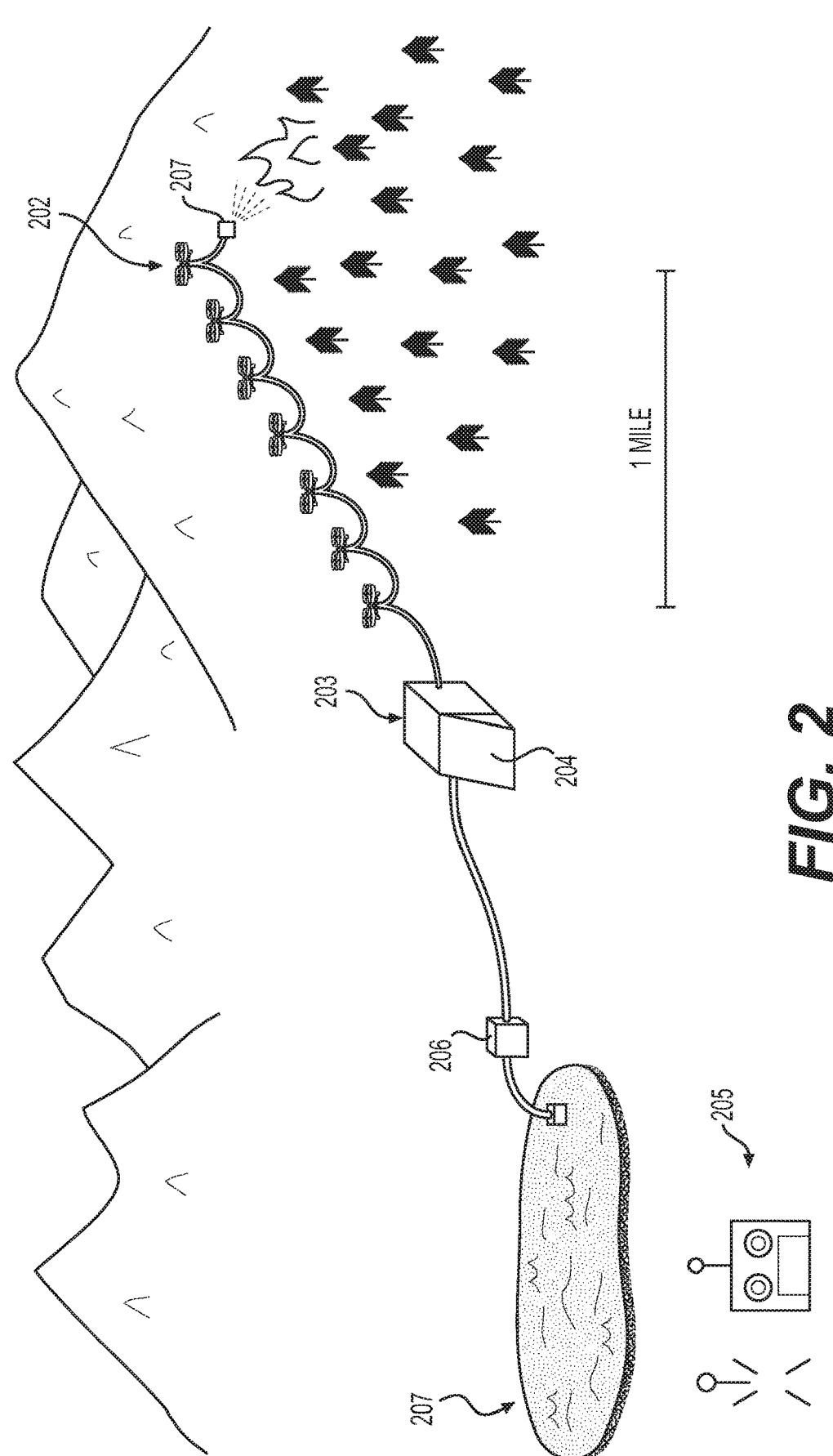
FIG. 2 is a schematic diagram of the beam system
including an aerial vehicle, a remote manual controller, a
power dispenser, a pump to that retrieves the fluid from the
fluid source an inflatable beam and a fluid dispenser that
distributes fluid through a nozzle.

FIG. 2 is a schematic diagram of an embodiment of the stationary fluid 204 such as a pond or pool in which the fluid is transferred via the pump 206 utilizing the remote command control 205 to draw the fluid to the remote fluid distributer 203 and utilizing the remote power distributer 204 the fluid will be dispensed along the inflatable beam with a fluid or power dispenser to the UAV 202 and distributed via the nozzle 207 to be used to eliminate the fire.

Figures 3, 4:
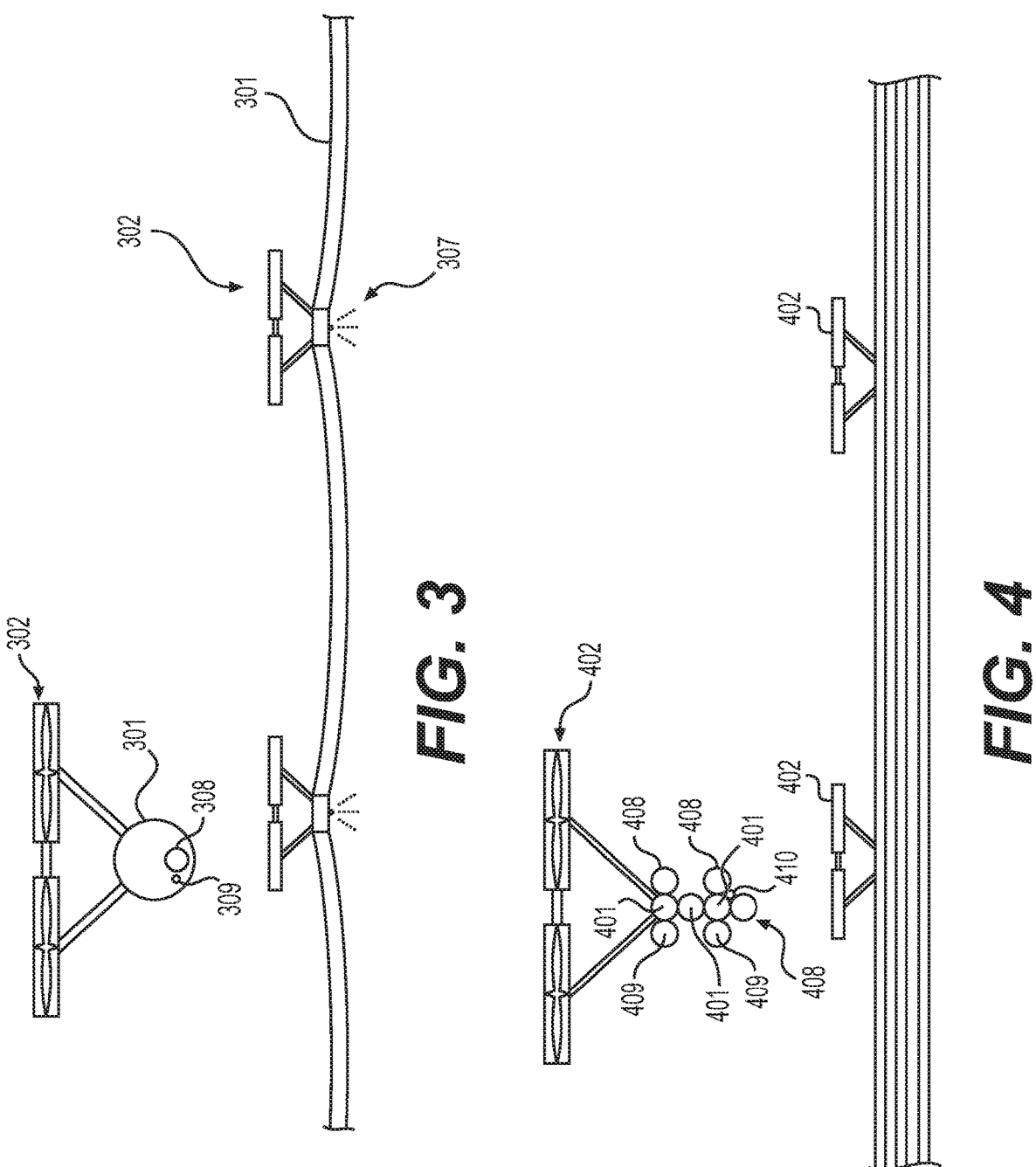
FIGS. 3 and 4 are schematic diagrams of the various
configurations of the beam system for the fluid, power and
beam.

FIG. 3 is a schematic diagram of the aerial beam system that discloses the aerial vehicle 302 being coupled to the inflatable beam 301. The system of FIG. 3 includes an embodiment of the present invention that discloses a fluid dispenser 308 and a power dispenser 309. The fluid and power dispenser are disposed within the inflatable beam. The inflatable beam is inflated upon flight by the control system of the aerial vehicle. The system and is rigid. The power and fluid dispensers are within the aerial beam and are affixed to the beam prior to the deployment of the aerial beam system. The fluid dispenser and the power dispenser are affixed to the aerial beam through well know methods. In this embodiment the inflatable beam is inflated. The fluid dispenser 308 includes a nozzle 307 that distributes the fluid from the fluid dispenser to the target surface.

FIG. 4 is a schematic diagram of an embodiment of the aerial system wherein the aerial vehicles 402 are connected to more than one aerial beam 401. The aerial beams 401 are connected to more than one fluid dispensers 408 and power dispensers 409. This embodiment demonstrates the versatility of the aerial beam system by providing more than one fluid and power dispenser. This configuration may be varied to include a different types and number of fluids, power dispensing, and aerial beams. The embodiment extends the versatility of the aerial beam system by providing an increased amount of fluid and power to remote locations. This configuration would require aerial vehicles that are capable of carrying larger payloads. Thus, the motor and the propellers may be larger than the aerial vehicles configured to carry only one combination of the fluid, power and beam.

Figures 5, 6:
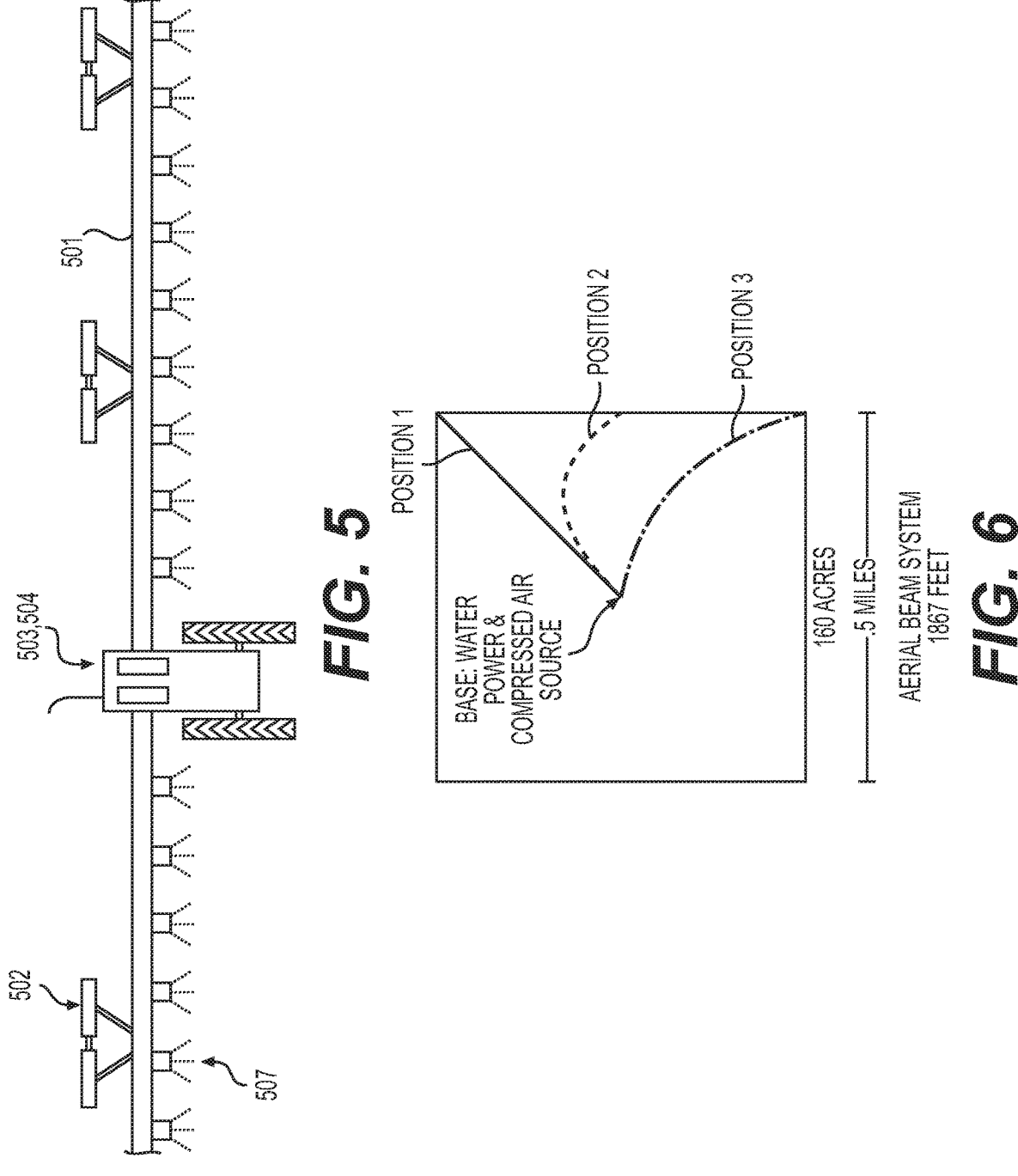
FIG. 5 is a schematic diagram of the beam system
utilizing a tractor that distributes fluid through the beam
system.
FIG. 6 is a schematic diagram of the beam system having
a center pivot point for fluid distribution about which the
beam can move from one position to the next.

FIG. 5 is a schematic view of a further embodiment that includes an inflatable beam system where the sources of the fluid 503 and the power 504 is within a tractor. This embodiment discloses the nozzles 507 that are disposed along the bottom of the aerial beam that are distributing chemicals or water to the target surface from the power and fluid dispensers. The aerial beams 502 are coupled to the aerial beam. This embodiment provides for a mobile system to distribute fluid along a target surface. As such it provides for extending the coverage area of the distribution system and allows the even distribution of fluid over an increased coverage target surface such as a field crop.

FIG. 6 is a schematic view of an alternative embodiment that includes an inflatable beam system where the base water and compressed air source are stationary and may be placed in a location that optimizes the use of the target fluid surface area. Particularly, the center pivot serves as a pivot point for the aerial beam about which the beam may be positioned in POSITION 1, moved to POSITION 2, and then to POSITION 3, as shown in FIG. 6. FIG. 6 further discloses that the inflatable beam is capable of bending, in contrast with prior pivot irrigation systems which may be cost effective, but they may only operate in circles or portions thereof and on generally flat, uninterrupted terrain. With the instant embodiment, an inflatable aerial beam would be able to fly a water delivery system over terrain too extreme for standard pivots as well as take advantage of its ability to bend, allowing it to irrigate squares or irregular shapes.

The amount of bending of the inflatable aerial beam may be adjusted as necessary, such as by controlling the extent to which the aerial beam is inflated. For example, the aerial beam may be set to a more rigid configuration in situations where transport or flight stability of the one or more aerial beam system, as well at the UAVs to which the beams are affixed, are necessary. The ability to adjust the amount of bending, flexibility, or rigidity of the aerial beams would be advantageous in, for example, windy environments, such as when controlling or stopping forest fires. In this ease, non-rigid beams could be constantly buffeted by winds and cause the UAVs to use up power more quickly in order to stay in flight and maintain flight stability.

The transport or flight instability arising from aerial beams with rigidity less than that required for flight stability may also make it more difficult to control, for example, the rate at which a fluid is released to a given target area. This in turn could result in longer periods required for the application of a fluid to a target area and require more trips to a fluid and power source. The transport or flight instability caused by less than optimal aerial beam rigidity or flexibility could also make it very difficult to dispense a required volume of fluid within a target area, especially when relatively uniform dispersal of fluid or powder is desired, such as when applying pesticides or fertilizers over a tract of agricultural land.

Under certain conditions, it may be more advantageous to reduce the rigidity of the aerial beams, especially in cases where it would make it easier to control the individual UAVs connected via the aerial beams. An example of this is when it is necessary to perform tricky aerial maneuvers along highly irregular terrains. In other cases, it may facilitate the delivery of a fluid to a target area by separately adjusting the flexibility or rigidity of each of the multiple aerial beams connected to several UAVs, for example, when it is desired to release a certain volume of fluid by adjusting the fluid flow rate partly by, for example, controlling the relative heights of the individual UAVs in highly-irregular mountainous terrains.

The UAVs and aerial beams may be adapted to each include one or more types of sensors such as wind direction and wind velocity sensors, flowrate meters, altimeter, fluid leak sensors, cameras, etc. Data from the wind direction and wind velocity sensors, for example, could be used to make it easier to control the UAV and aerial beam system, as well as used to generate prompt control adjustments to the UAV and aerial beams, predict any necessary control adjustments to minimize the likelihood of transport and flight instabilities and crashes, fluid or air leaks, as well as used to adjust fluid delivery rates depending on prevailing environmental conditions or specific application or purpose of fluid delivery to a target area.

Data collected by the aerial beam systems sensors may be transmitted wirelessly or by wired means to a computing and storage device where they can be stored, processed, and analyzed. The analyzed data may then be used to determine a set of control parameter values, ranges, or thresholds that would provide optimal control given a similar future set of sensor data corresponding to a target area's environmental conditions. The accumulated set of sensor data may also be used to allow automated control settings and adjustments to reduce or eliminate the need to perform manual controls of the UAV-aerial beam system, which would be particularly advantageous when using a multiple UAVs and multiple inflatable aerial beams. For example, the accumulated sensor data set collected over time can be used as training data to allow learning by an adaptive or smart intelligent control module for the UAV-aerial beam system based on machine learning, deep learning, neural network, reinforcement learning, etc.

Using sensor data collected by the aerial beam system's sensors may thus allow for necessary control settings or control adjustments to one or more of the inflatable aerial beam's rigidity; relative heights and positions, as well as the, relative speeds of the aerial beam carriers or UVAs; including the rate of pumping and amount of opening of the nozzles for delivering a material within a target area at a desired level of speed, uniformity, etc. The collected sensor data may also be used to determine if one or more of the aerial beams are having leaks; whether one or more of the aerial beam carriers have been damaged (e.g., from soot or heat); or whether a bigger or more powerful UVA or aerial beam carrier among the multiple UVAs that are aloft should be assigned or instructed to carry a greater load due to a damaged UVA that is functioning at less-than-optimal capacity or efficiency. In addition, the collected sensor data (e.g., imaging data) may also be used to identify those portions of a target area that needs one or more additional fluid or material deliveries. Further, the collected sensor data may also be used to determine whether additional aerial beam systems are needed as backup in case the desired rate or volume at which a fluid or material is being delivered is turning out to be insufficient under the circumstances.

Additionally, this embodiment may accommodate pivot placement that is not in the center of the irrigated area. The fluid delivery system may be modified to fit the specific application of use. Accordingly, the particular nozzle configuration may be varied, and the delivery system of the fluid may be controlled by the controller to maximize the efficiency of the fluid delivery dependent on the application.

Figure 7:
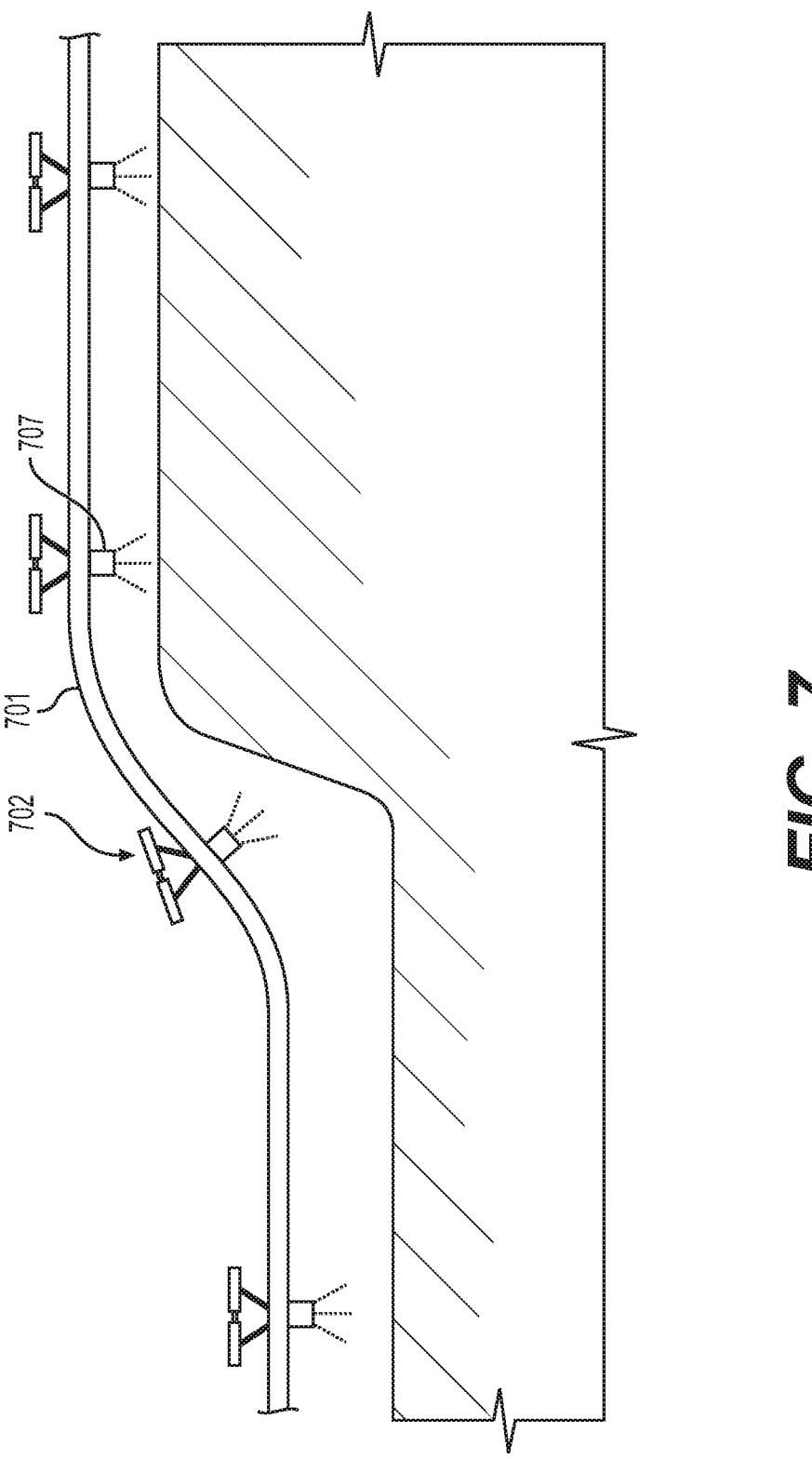
FIG. 7 is a schematic diagram of the flexible aerial beam
system showing fluid distribution via the aerial beam system
over an uneven target surface.

FIG. 7 is a schematic illustration of an embodiment of the aerial beam system where the aerial vehicle may fly over uneven terrain. In this embodiment. The aerial vehicle 702 includes an aerial beam 701 and a fluid delivery system that includes nozzles 707. In this embodiment the aerial beam 701 may be flexible upon inflation and thus bend over the target surface to maximize the coverage of the fluid onto the target surface. This embodiment is particularly helpful for distribution of fluid over remote uneven surfaces not previously accessible with standard fire-retardant systems or crop-dusting systems.

Figure 8:
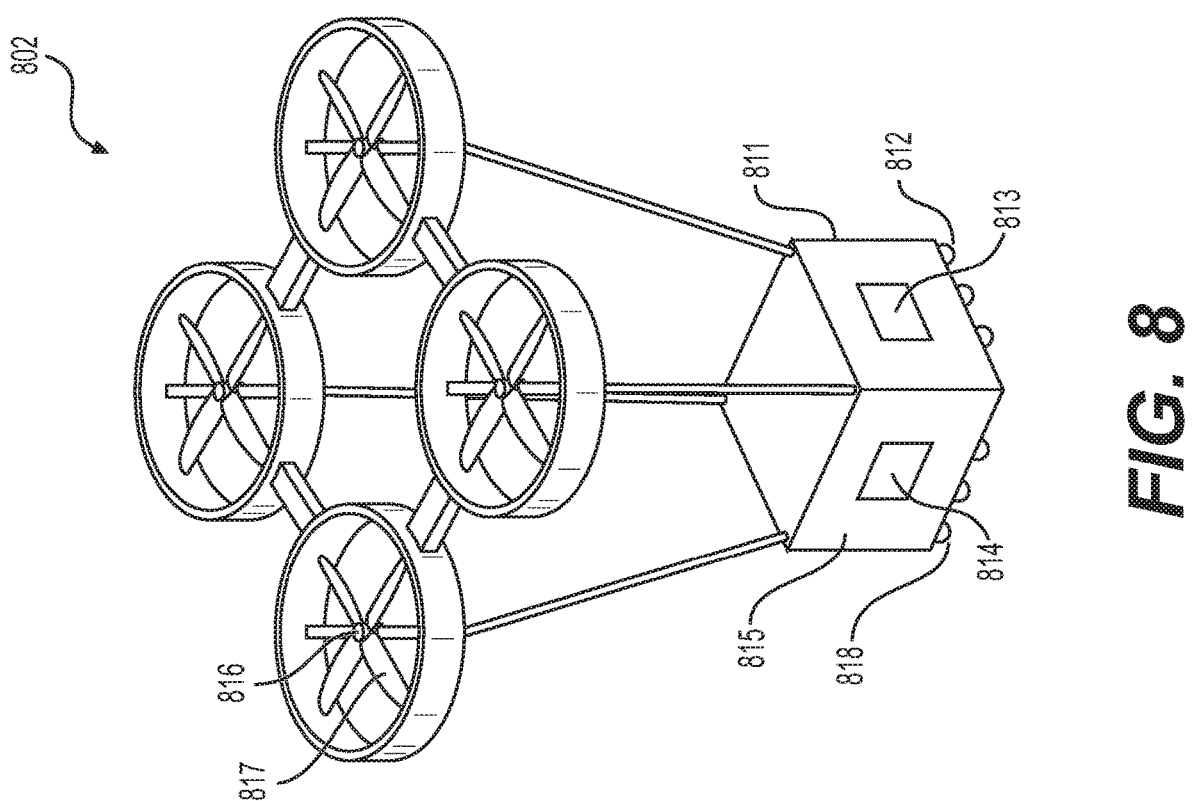
FIG. 8 is a schematic diagram of an aerial vehicle that
includes a body, rotors, propellers, and a sensor array.

FIG. 8 is a schematic view of an embodiment of an aerial vehicle 802. Aerial vehicle 802 includes an aerial vehicle that is a UAV. The UAV, as disclosed in FIG. 8, may include a body 811, rotors 816, and propellers 817. The aerial vehicle may also include a sensor array 812 on the aerial vehicle. The sensor array 812 may include thermal sensors to detect the hottest portion of a fire, which may assist the controlling individual (manual controller—205) or the computerized control system 105 in determining the best points to direct water or other extinguishant onto a fire. Other sensors within the sensory array 812 may include an altimeter, so that the operator, piloting the UAV 802 via remote control, is aware of the altitude of the UAV 802. The sensor array 812 may also include cameras, including but not limited to a night-vision camera, providing a live video feed through the control wires of the present invention, as well as through other methods including wireless communication, blue tooth, telephone networks, FIOS, radio communication, and the like.

The control system 813 of the UAVs may also include controls that regulate the distance between aerial vehicles and the dispensing of the fluids from the system. Additionally, the control system may also control the power distribution from the remote power distributer to a power dispenser and then to the UAVs and the power distribution to the remote power receiver 104A. The control system is a conventional control system that is controlled via a computer, an automatic navigation system or manually, through a manual remote control. The control system may, in another embodiment, control the positioning of the aerial beam with respect to the connection structure 815.

The fuel powering the UAV 802 is preferably electricity and is delivered via conventional power cables contained within the inflatable aerial beam. The electricity preferably powers the sensor array 812, at least one electric motor 814, and potentially, at least one directional servo motor 814. The present invention: may employ at least one directional servo motor to direct or make adjustments to the angle of the at least one electric motor 814. It is envisioned that the present invention may include a lighting system 818 designed to illuminate the ground or other building or object ablaze. The illumination will aid the operator of the UAV 802 located on the ground, as the nozzle 807 is directed at the proposed target, be it a fire or crop field dependent on the application.

The control system 813 may include one or more processors 202 and one or more computer readable media that stores various modules, applications, programs, or other data. The computer-readable media may include instructions that, when executed by the one or more processors, cause the processors to perform the operations described herein for the control system 813, the computer controller 105 and the hand controller 205.

In some implementations, the processors(s) may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program modules, program data, and/or one or more operating systems. The one or more control systems, computer controller and remote control, may include one or more cores.

Embodiments may be provided as a computer program product including a non-transitory machine-readable storage medium having stored thereon instructions (in compressed or uncompressed form) that may be used to program a computer (or other electronic device) to perform processes or methods described herein. The computer-readable media may include volatile and/or nonvolatile memory, removable and non-removable media implemented in any method or technology for storage of information, such as computer-readable instructions, data structures, program modules, or other data. The machine-readable storage medium may include, but is not limited to, hard drives, floppy diskettes, optical disks, CD-ROMs, DVDs, read-only memories (ROMs), random access memories (RAMS), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The control system of the aerial vehicle is configured to control the avionics of the present invention. The avionics of the present invention is similar to those that conventional UAV and manned aerial vehicle employ. The present invention is designed to be easily controlled from the ground via a remote control 105. This remote control may be built into a terminal command station, such as at the base or interior of the control system 813. The avionics package of the present invention is preferably outfitted to control the steering, thrust, pitch, and yaw. All these functions can be directed to be handled automatically, directed by a wireless hand controller or, via a computer on the ground or in a remote mobile station.

Figure 9:
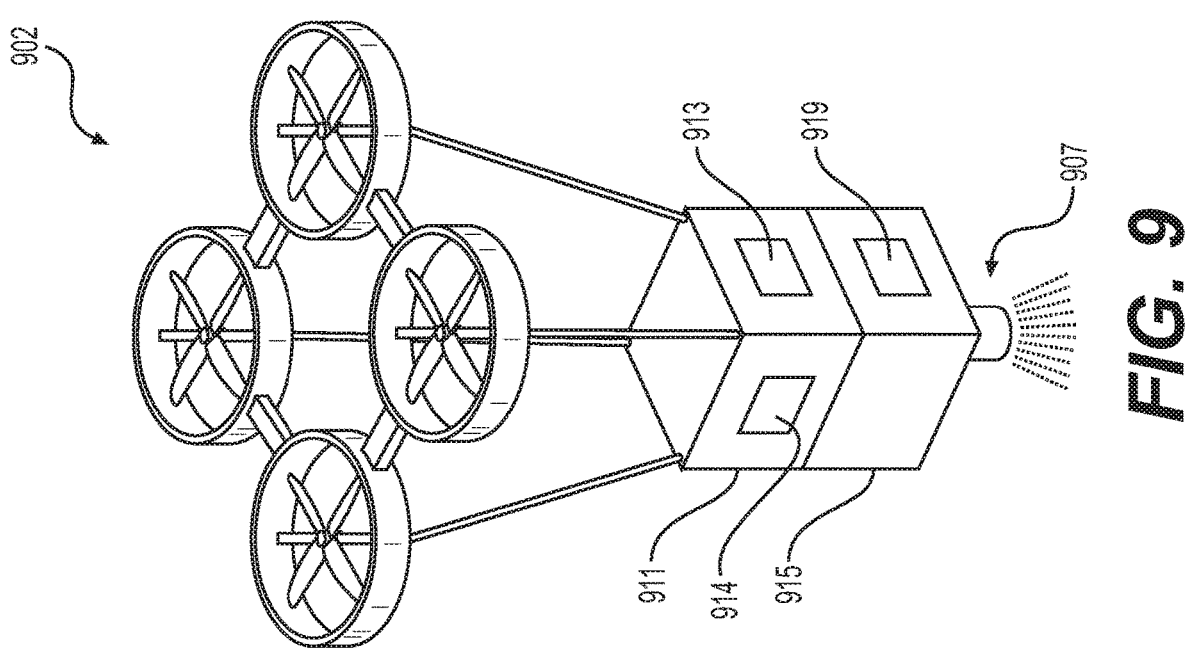
FIG. 9 is a schematic diagram of an aerial vehicle that
includes a first body attached through a coupling structure to
a second body.

FIG. 9 is another embodiment where the aerial vehicle 902 includes a separate body 911 that is attached to the coupling structure 915. In this embodiment the coupling structure 915 is added to the existing body 911 of the aerial vehicle. The coupling structure of the aerial vehicle may include compression fluid to inflate the aerial beam (not shown). The compression fluid is controlled by the control system. The control system may receive signals from either a remote controller or may be pre-programmed to inflate at an altitude. In the embodiment of FIG. 9, the aerial vehicle is modified to include the connecting structure. In this embodiment, the sensor array 812 may be arranged such that they automatically guide the nozzle 907 of the UAV 902 to the optimal target.

The aerial vehicle embodiment of FIG. 9 further includes at least one directional servo motor 914 on the body 911of the aerial vehicle.

In an alternate embodiment the inflatable aerial beam system is equipped with a conventional airbag system 919, which will deploy to protect the main body of the aerial vehicle from: damage in the event of a crash. It is envisioned that the airbag would preferably envelope the entirety of the aerial vehicle in the present invention in the event of a collision or crash.

Figure 10A:
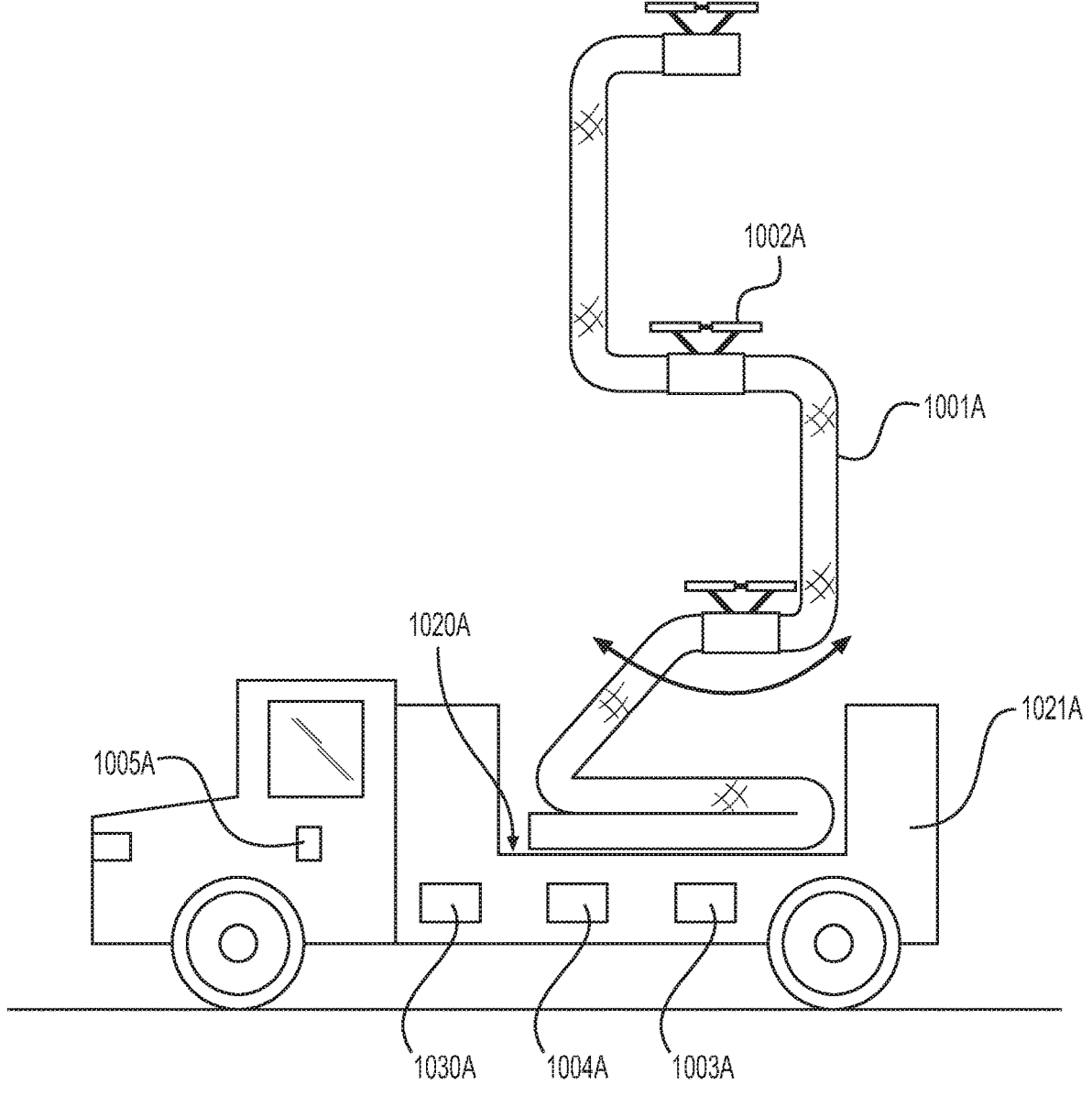
FIGS. 10A-C are schematic diagrams of the docking
system for the aerial vehicles.
Figures 10B, 10C:
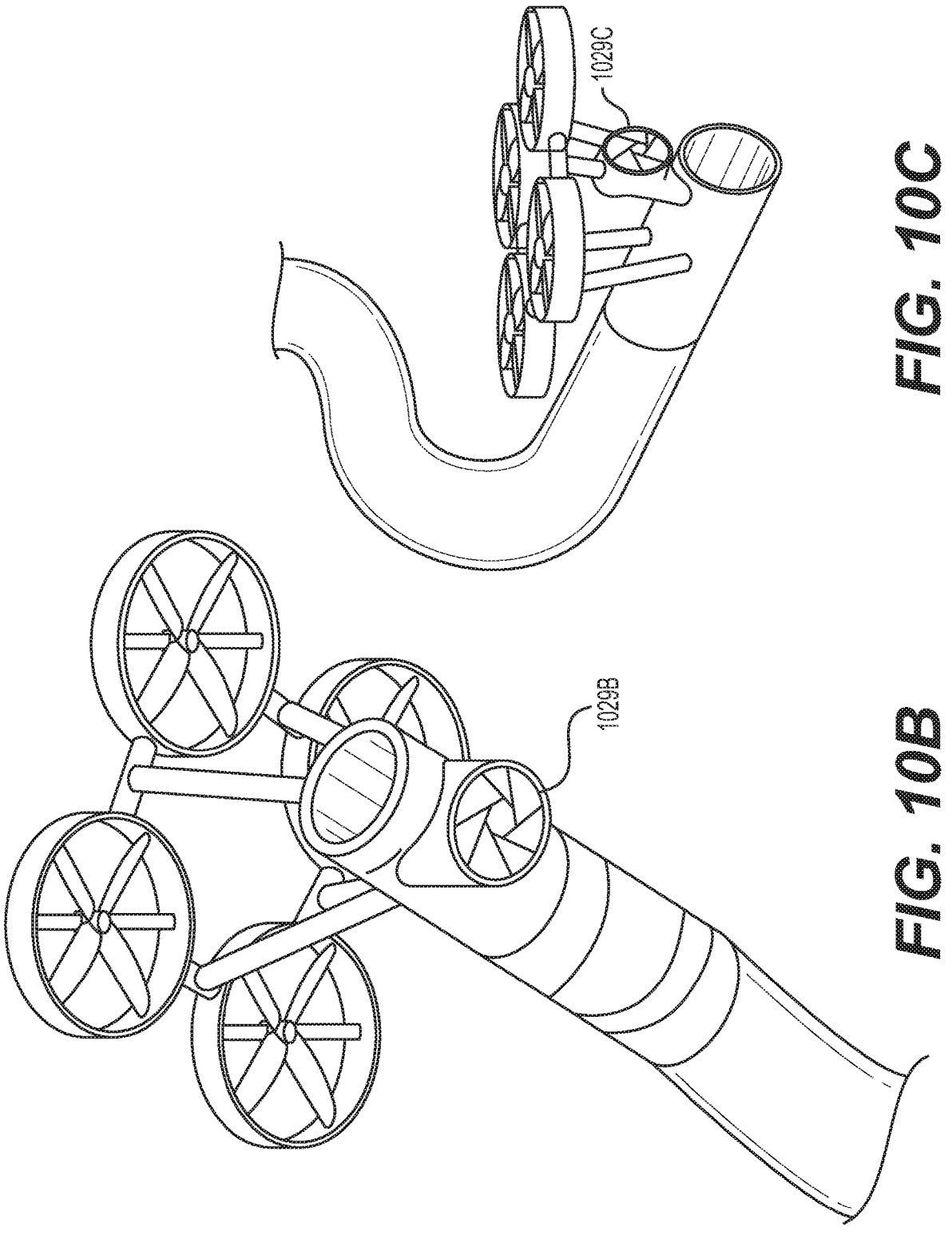

FIG. 10A is a schematic illustration of an embodiment of the aerial beam system that includes a docking station 1021A for the aerial beam system that can also serve as a remote control, a remote fluid 1003A, a remote power 1004A and remote inflation fluid for the aerial beam 1001A. The remote inflation fluid may include compressed fluid to inflate the inflatable beam 1001A. Other inflation methods may be employed to inflate the inflatable beam. The system of FIG. 10A may control the docking with remote controller 1005A. The remote controller is capable of controlling the inflation, the fuel dispensing, the power dispensing and the docking of the aerial vehicles. To that end the remote control may be configured to automatically dock the aerial vehicles controlling the deflation of the aerial beams as the system retreats into the docking station. The docking may include a vertical stacking of the vehicles or may stack the vehicles horizontally (not shown). The UAV's include a docking connection 1029B and 1029C on the UAV. The docking station may be a mobile docking station as shown in FIG. 10A or a stationary docking and command station (not shown). In this embodiment the system provides versatility and mobility. The mobile docking station may be mobilized to any location and deployed to reach a target not previously attainable by other systems.

Figures 11A, 11B:
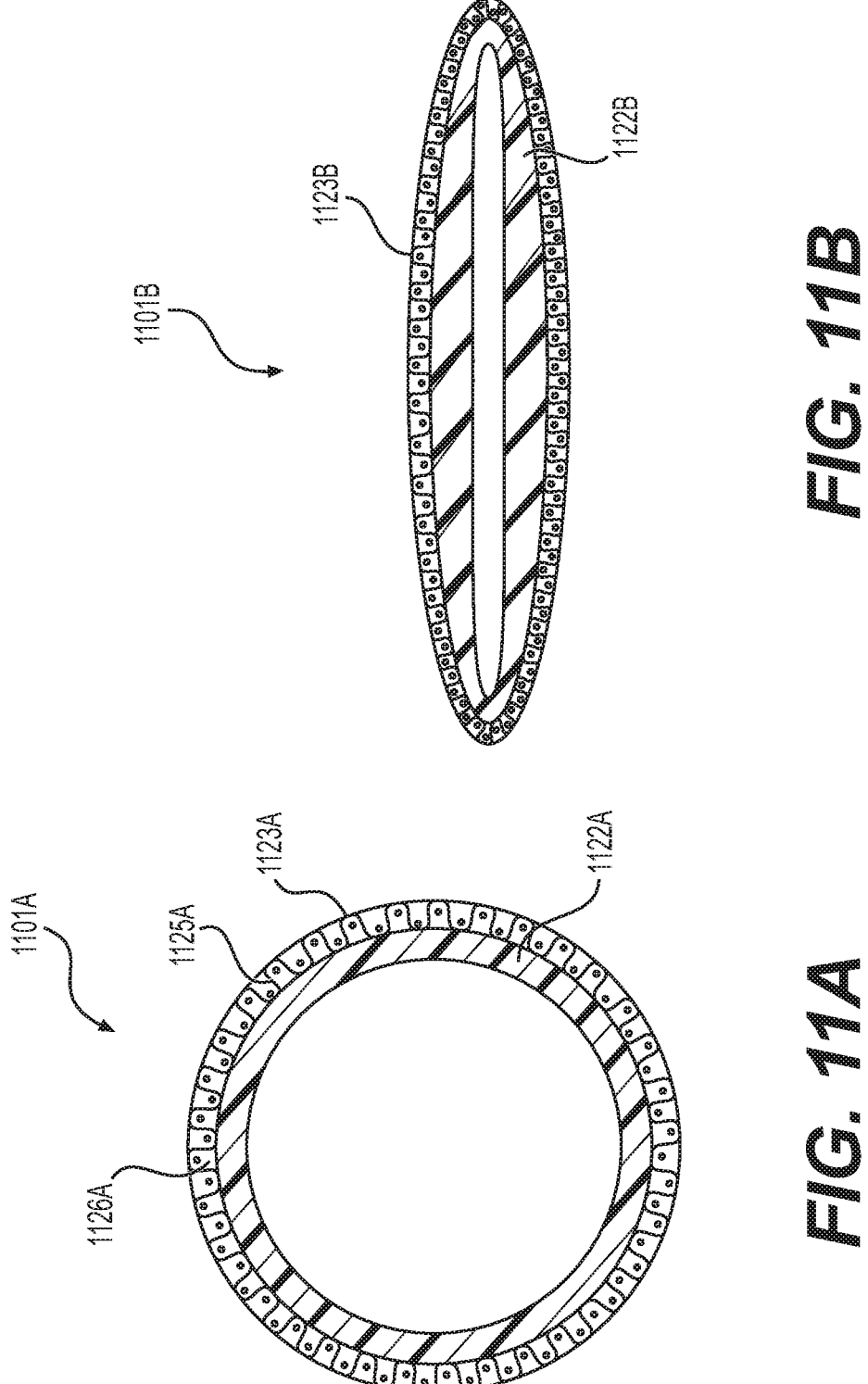
FIG. 11A is a schematic diagram of the inflated state of the
inflatable beam.
FIG. 11B is a schematic diagram of the deflated state of
the inflatable aerial beam.

FIGS.11A-B are schematic illustrations of an aerial beam in the inflated state 1101A in FIG. 11A and a deflated state 1101B in FIG. 11B. FIGS. 11A-B which schematically illustrate a cross-sectional view of an air beam 1101A-B having a braided sleeve 1123A e.g. a triaxial braided sleeve, surrounding an air bladder as seen in FIGS. 11A-B and as described in U.S. Pat. No. 6,182,398, the entire disclosure of which is incorporated herein by reference. Braided sleeve includes axial fibers 1126A, B which are preferably equally or regularly spaced along the circumference of sleeve, and bias fibers 1125A as are known in the art. Such triaxial braided sleeves, having equally or regularly spaced axials, are well-known in the art of braiding. The air bladder 1122A, B may be replaced by a pre-formed elastomeric liner, or the braid fibers may be impregnated with an elastomeric solution that forms a gas barrier after curing, as described in U.S. Pat. No. 5,421,128, the entire disclosure of which is incorporated herein by reference. The diameter of the Sleeve should be substantially the same as or slightly larger than the inflated inside diameter of the braid. The plastic sleeve may be brought into full contact with the inner surface of the braid by maintaining a low inflation pressure air pocket in the sleeve between the source of the sleeve and nip puller which forms the braid. This technique is known in the art.

Axial fibers 1126A, B may include any suitable reinforcing fibers, as are known in the art, such as aramid (Kevlar), fiberglass or carbon, or synthetic fibers such as acrylic, nylon, rayon, polypropylene, ultra-high molecular weight polyethylene, polyamide and/or polyester fibers. Carbon fiber can be used in application where electrical conductivity is desired. Fibers of similar or identical materials as axial fibers may be used as bias fibers in the braided sleeve. The proper denier weights of the fibers are determined based upon strength requirements. Sleeving diameters may vary from about 0.25 inch and should be sufficiently large to enable insertion of an inflated air bladder, to about 36 inches, depending on the specific application of the air beam. For example, a sleeve diameter of 8-20 inches is suitable for various applications, such as the aerial fluid dispensing and power distributing discussed herein. The length of the air beam can vary from inches to kilometers, depending on the application.

Depending on the application or nature of the fluid to be delivered, the braided sleeve or the air bladder may also incorporate one or more outer or inner layer of material, alloys, or other composite materials to enhance or expand the range of flexibility or rigidity of the inflatable aerial beam that can be set (e.g., metamaterials that can change rigidity from that of a soft rubber to that of a hard steel; piezoelectric materials, which can bend, contract, or expand upon application of a voltage; shape memory alloys and polymers that can undergo substantial deformation and change back to its original shape; magneto-resistive materials, which can undergo a change in shape upon application of a magnetic field; photomechanical materials, which can change shape upon light exposure; magnetic shape memory alloys; as well as other materials such as smart inorganic polymers, pH-sensitive polymer, thermally-sensitive polymers). The one or more inner or outer layers may also be included and selected to allow, for example, chemical compatibility with the fluid (for example, to minimize any undesirable chemical reactions and prevent or reduce chemical corrosion caused by the fluid), provide enhanced air barrier to prevent compressed air leaks, reduce the likelihood of certain gases leaking into the atmosphere, enhance the aerial beams structural strength, provide added protection to the aerial beam from repeated exposures to the elements such as heat, smoke, snow, rain, etc. Each inner or outer layer's thickness may be adjusted depending on the purpose, application, or type of fluid to be delivered to a target area, as well as on the prevailing environmental conditions within the target area.

A partially exploded diagrammatical view of a composite structural component is shown in a cross-section transverse to a longitudinal axis of the structural component in the deflated, pre-deployed form FIG. 11A, which may be in an as-manufactured configuration. As used in the present description, the term "pre-deployed" means the state of the structure and any of its components before application of a rigidizing media. Rigidizing media is defined as a material for causing the pre-deployed structure or portions of the pre-deployed structure, for example, one or more of its components, to change shape or configuration facilitating the erection of the structure into an intended as-deployed state or configuration. Examples of rigidizing media include, but are not limited to, compressed gas such as compressed air, nitrogen, helium, or other gas, pressurized or non-pressurized liquids for example water, glycol, or other liquid, or liquefied or flowable solids for example granular solids and powders and flowable, uncured concrete, and various combinations thereof.

An inflatable composite structural component is shown in FIG. 11A. The inflatable beam, in an alternate embodiment, can be structured as is described in Pub. No.: US 2014/0370206A1, to Head et al., the entire disclosure of which is incorporated herein by reference.

A braided material typically includes three or more strands of material, commonly called tows, such that each tow is intertwined with other tows in a repeating pattern. Two dimensional braided materials are those wherein the repeating pattern is largely characterized by two or more principal directions in a plane, typically a longitudinal or axial direction of the braided fabric, and one or more oblique directions, commonly called bias directions, bias directions being a predetermined angle to the longitudinal direction. Three-dimensional braided materials are those wherein additional principal directions, typically being perpendicular to the longitudinal and oblique directions, are used to define the structure and the patterns thereof. For simplicity of description these additional directions are generically referred to as radial directions, whether the structure is generally tubular in form, laid out as a flattened tubular form or in a fabric, or generally planar, form.

In this disclosure reference to braided fabric is generally directed to two-dimensional fabric forms but one skilled in the art recognizes that three-dimensional braided materials may be used embodiments of the present invention as desired to satisfy requirements of particular applications.

The terms "strand", "tow", "yarn," "yarn bundle", "fiber" and "fiber bundle" are generally meant to describe what is laid into or intertwined in each of the principal directions of a braided fabric. In this disclosure the term "tow" will generally be used to describe what is laid into or intertwined in each of the principal directions of a braided fabric. A tow is an amalgamation of all material that runs together in a principal direction. A tow can comprise monofilaments, multiple filaments or comprise staple, or spun, material. Tow material can have a variety of cross-sectional shapes, including but not limited to, generally circular, ellipsoidal, triangular and flat tape shapes. Tow material may be subject to intermediate or intermediate or pre-processing may include, but are not limited to, twisting, braiding small numbers of filaments into braided tow materials, pre-impregnation with resins and specialty coating to facilitate braiding and/or subsequent processing. A tow can comprise any combination of these materials and material forms. A tow may comprise one or more than one filament or staple materials. As non-limiting examples., a tow may include carbon materials, basalt, glass materials, thermoplastic polymeric materials, thermoset polymeric materials, a combination of carbon and polymeric materials or a combination of polymeric and glass materials, or some combination thereof.

Biaxial braid typically includes only bias tows. Triaxial braid typically includes both bias and axial tows. Hybrid braided fabrics are contiguous materials having regions of biaxial braid and regions of triaxial braid, the regions typically in a desired arrangement.

Figures 12, 13:
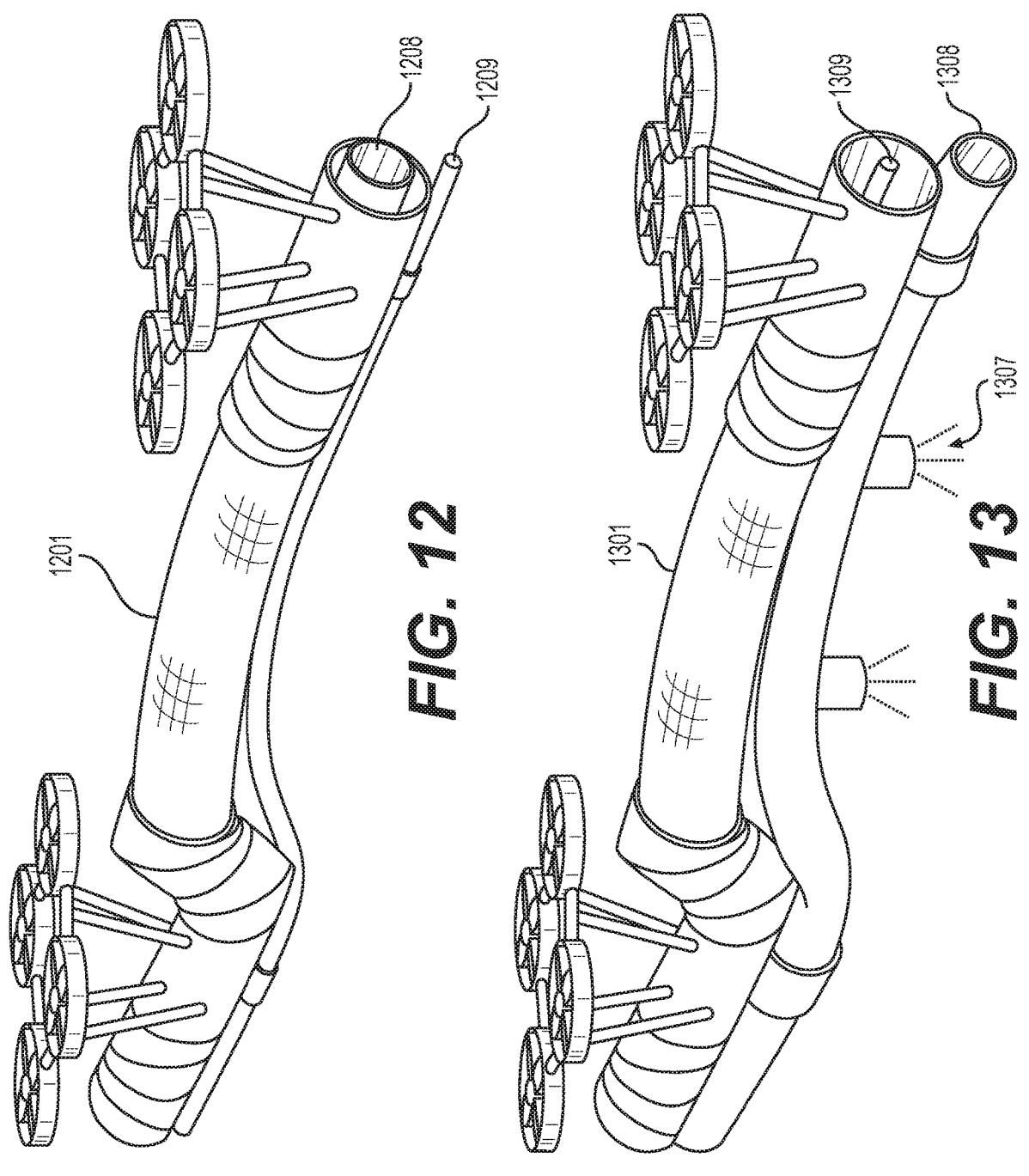
FIGS. 12-15 are schematic diagrams of the various con-
figurations of the power and fluid dispenser in combination
with the beam.

FIGS. 12-16 schematically illustrate alternate embodiments for the configurations of the power dispenser, the fluid dispenser and the fluid dispensing nozzles. In FIG. 12 the fluid dispenser 103 is located within the aerial beam 1201. The power dispenser 1209 is connected to the outside of the aerial beam. It is understood that the connectors for the fluid and the power dispensers can vary and are well known in the art. Additionally, the fluid and power dispensers are detachable from the aerial system thereby increasing flexibility of the system and ease of installation or repair.

FIG. 13 schematically illustrates the power dispenser within the aerial beam and the fluid dispenser attachable to the bottom portion of the aerial beam. This embodiment provides for nozzles to be distributed along the bottom fluid dispenser. Such a configuration provides for a controlled distribution of the fluid through the nozzles. As in the previous embodiments the fluid dispensing may be controlled by the control system on the aerial vehicle.

Figures 14, 15:
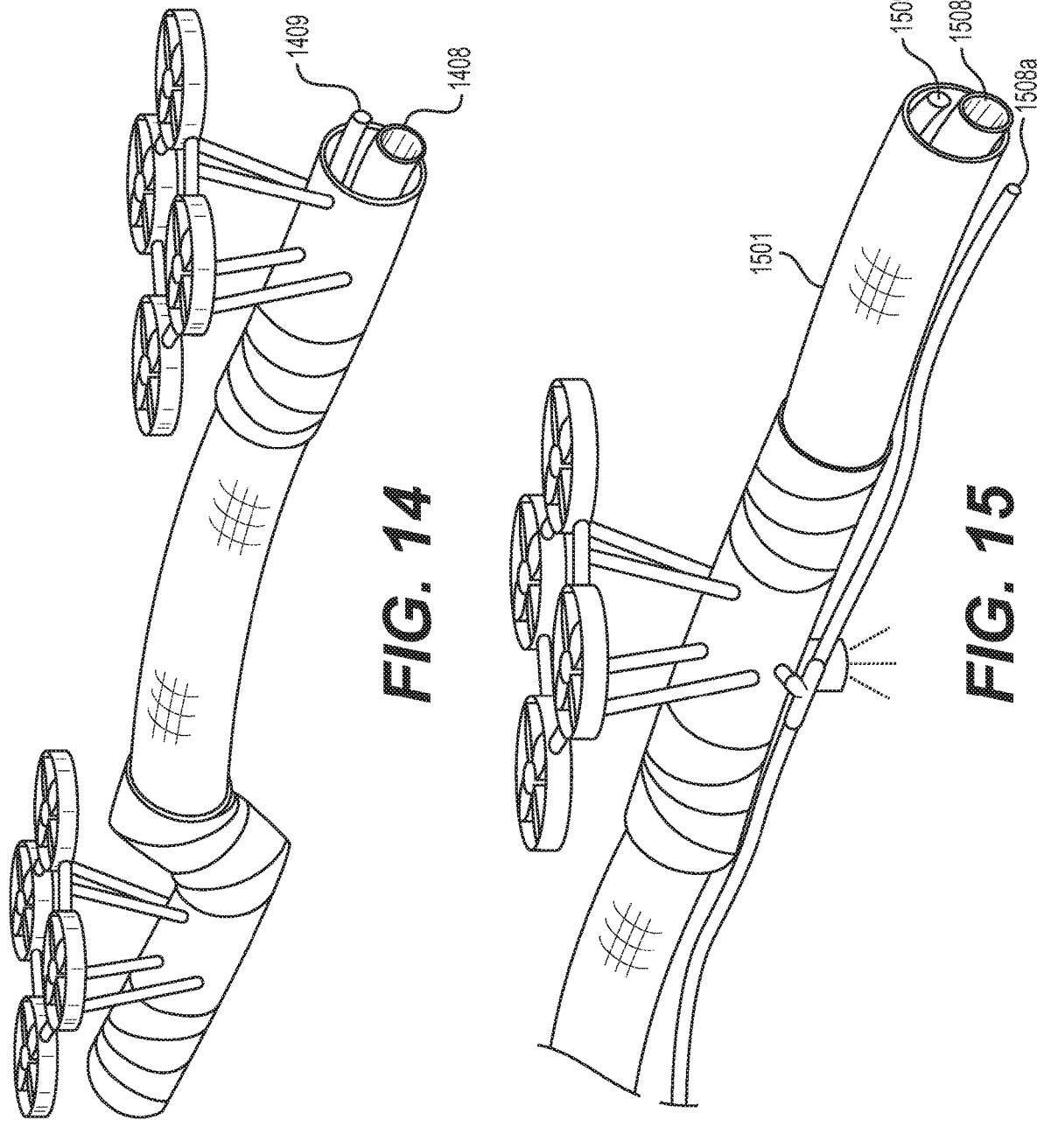
Figures 16, 17, 18:
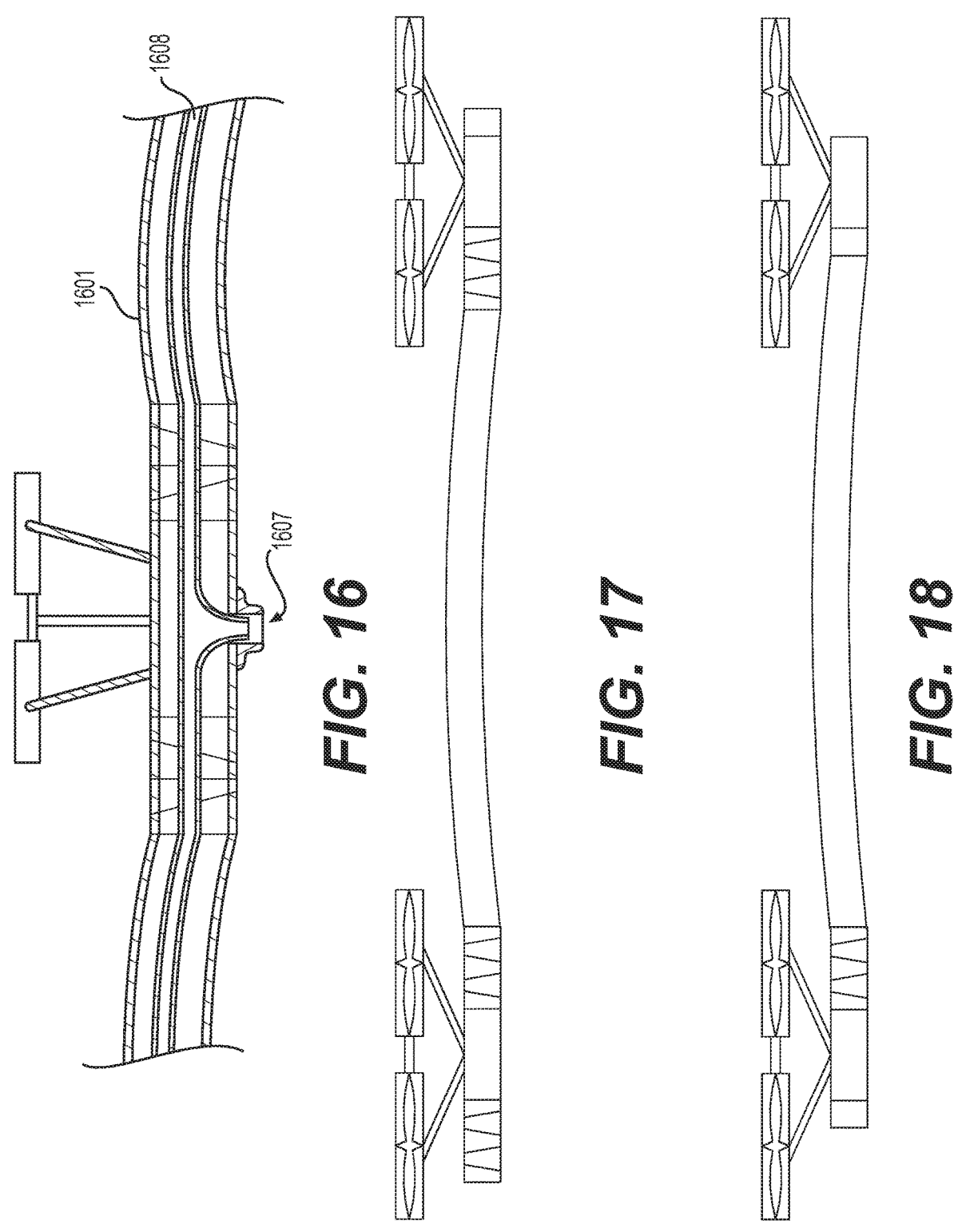
FIG. 16 is a schematic diagram of the fluid dispenser
attached to the internal structure of the aerial beam.
FIGS. 17-25 are schematic diagrams of the various con-
figurations for the connections of the aerial vehicle and the
aerial beam.

FIG. 14 schematically illustrates an aerial beam 1501 having both the fluid dispenser 1503 and the power dispenser 1504 located within the aerial beam 1501. In a further embodiment the aerial beam system of FIG. 15, includes an additional power dispenser that may be utilized to distribute power to a remote power receiver such as that disclosed in FIG. 1. The embodiment of FIG. 15 provides for versatility of the power distribution system. In the embodiment of FIG. 16, the aerial beam 1601 includes a fluid dispenser 1608 that is attached to the internal structure of the inflatable beam 1601. Additionally, this embodiment provides for a fluid dispenser 1608 that is configured to extend from within the aerial vehicle to the outside of the aerial beam. The fluid dispenser is coupled to a nozzle 1607 that protrudes from the inside of the aerial beam to the exterior of the aerial beam. This embodiment provides for the fluid to be expelled through the center of the body of the aerial vehicle. Such a configuration provides increased stability for the aircraft as well as the entire aerial beam system as the fluid distribution will not destabilize the vehicle requiring the need for a more sophisticated control system.

Figures 19, 20:
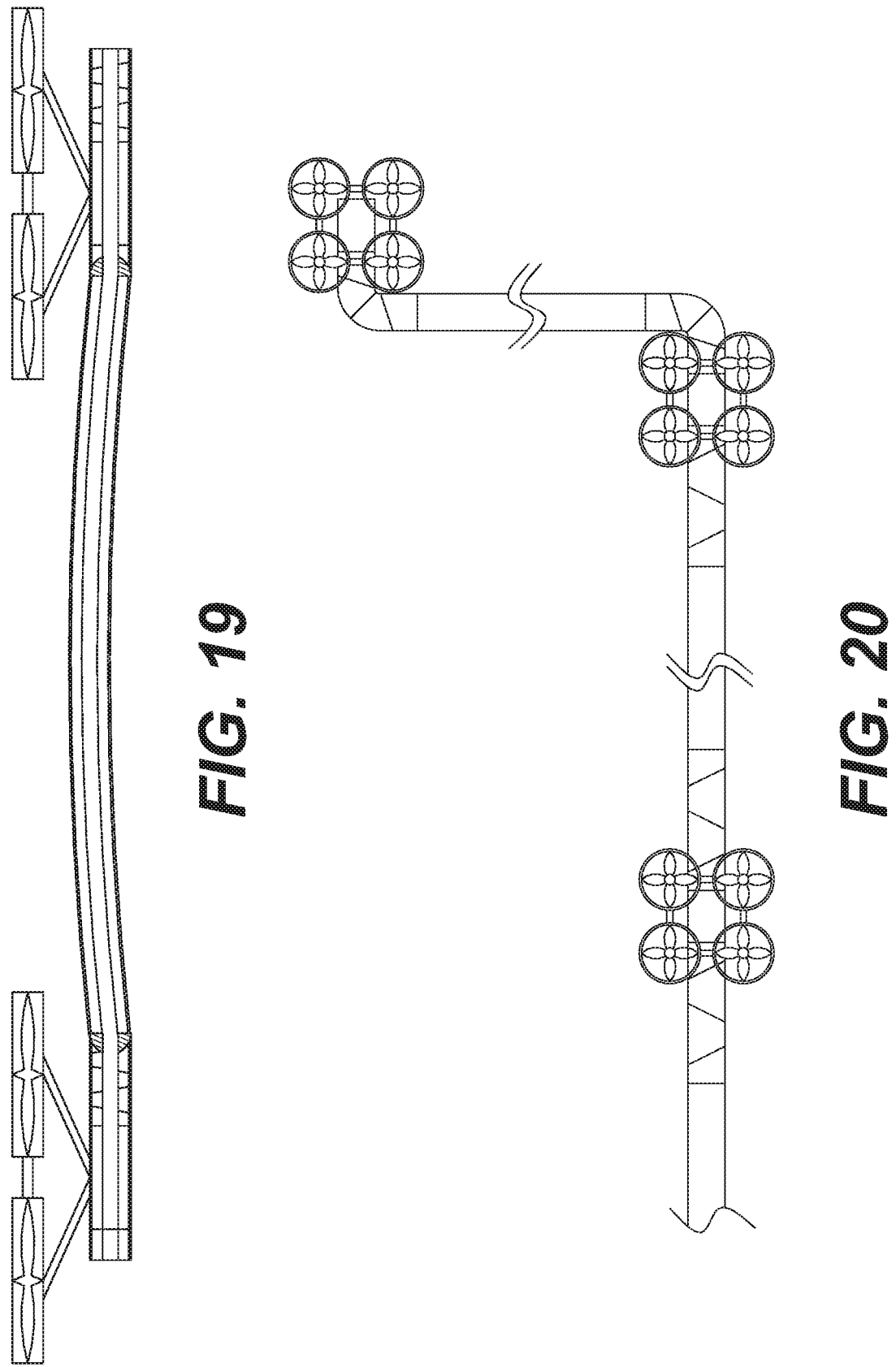
Figure 21:
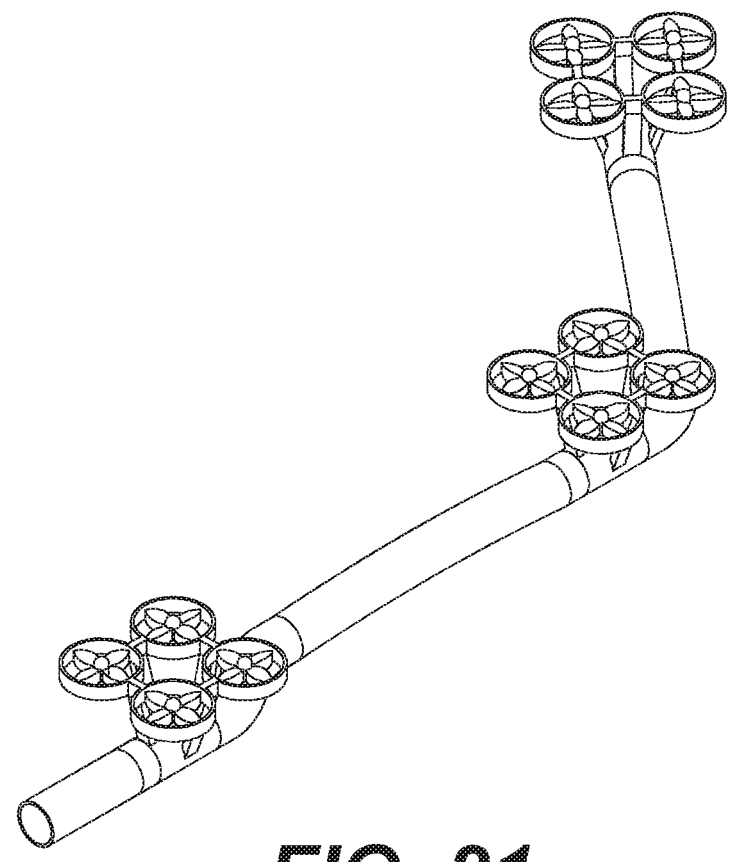
Figure 22:
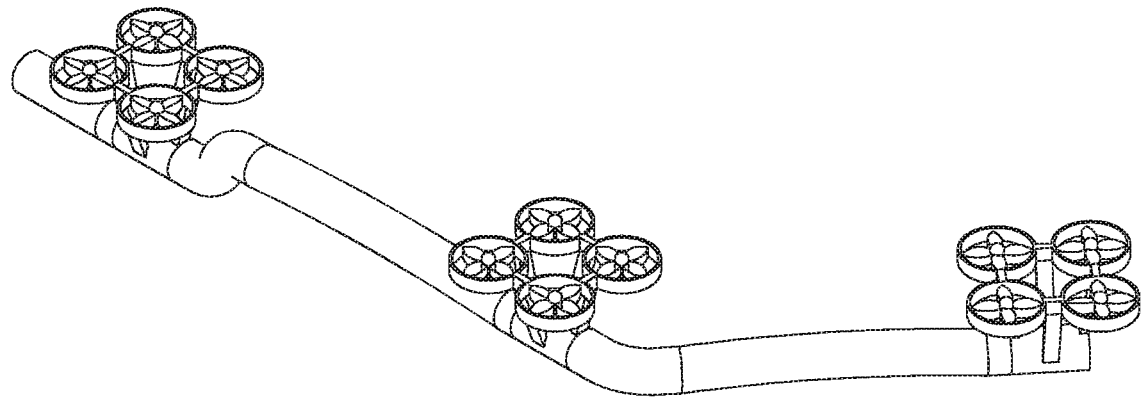

FIGS. 17-19 schematically illustrate various embodiments for the connectors of the coupling structure to the aerial beam. Specifically, for FIG. 17, the embodiment illustrates a first aerial vehicle and a second aerial vehicle. The embodiment provides for a flexible "accordion" type connection at both end of the vehicle. This embodiment allows for increased flexibility of the aerial beam system as well as maneuverability between the two aerial vehicles. The embodiment of FIG. 18 varies the configuration of FIG. 18 by providing a flexible connection at only one end of the aerial beam. This system saves costs and may be appropriate from some applications where a flexible connection is not required at both ends of the aerial beam connecting with the coupling structure of the aerial vehicle. FIG. 19 provides for a connection between the aerial beam and the connecting structure that pivots at the connection with a ball and socket type of connection the connection allows the aerial beam to pivot or rotate along the connection adding increased flexibility and maneuverability to the aerial beam system.

Figures 23, 24:
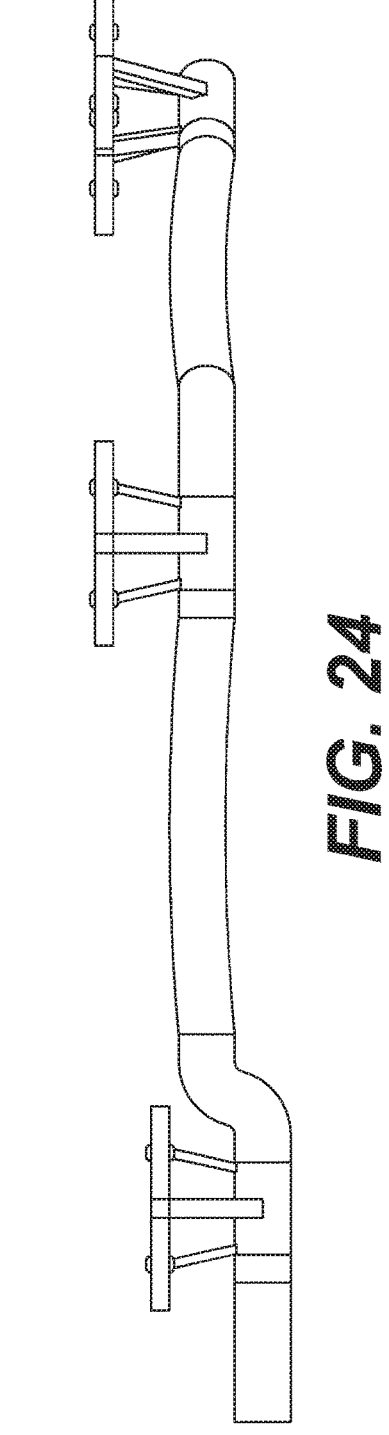
Figure 25:
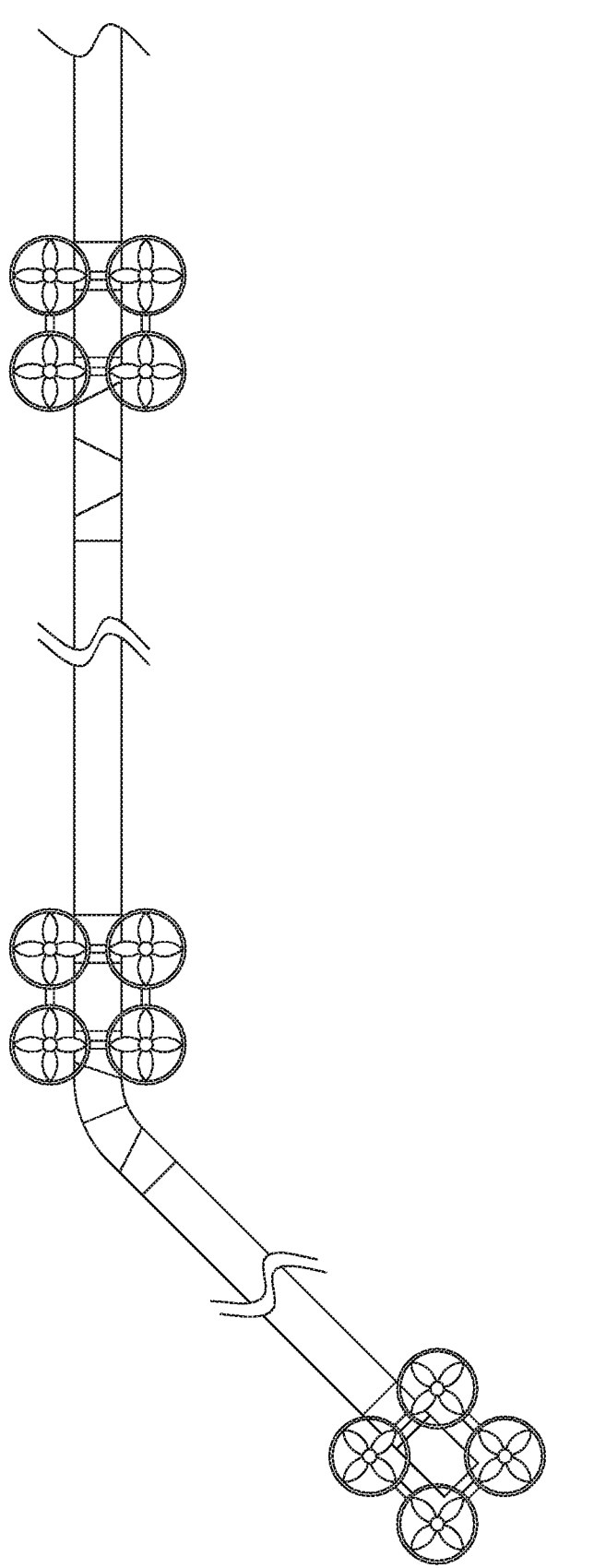

FIGS. 20-25 disclose various embodiments of the aerial beam system where the configuration of aerial beam varies between aerial vehicles. The configurations include L-shaped as disclosed FIG. 20, an L-shape and a step down as disclosed in FIG. 21, a wide-angle V-shaped with a step-down connection as disclosed in FIGS. 22 and 25 and a single wide-angle V-shaped connection as disclosed in FIG. 23. FIG. 24 discloses a side view of the configuration of FIG. 22 with the wide-angle V-shape in combination with the step-down connector configuration that is at a second connection of the aerial beam. It is to be appreciated that there may be unlimited shapes and configurations for the aerial beam system that have not been disclosed but are encompassed within the bounds of this embodiment. The need for various limitations is dependent on the type of application needed and the target surface for the aerial beam system.

Figures 26, 27:
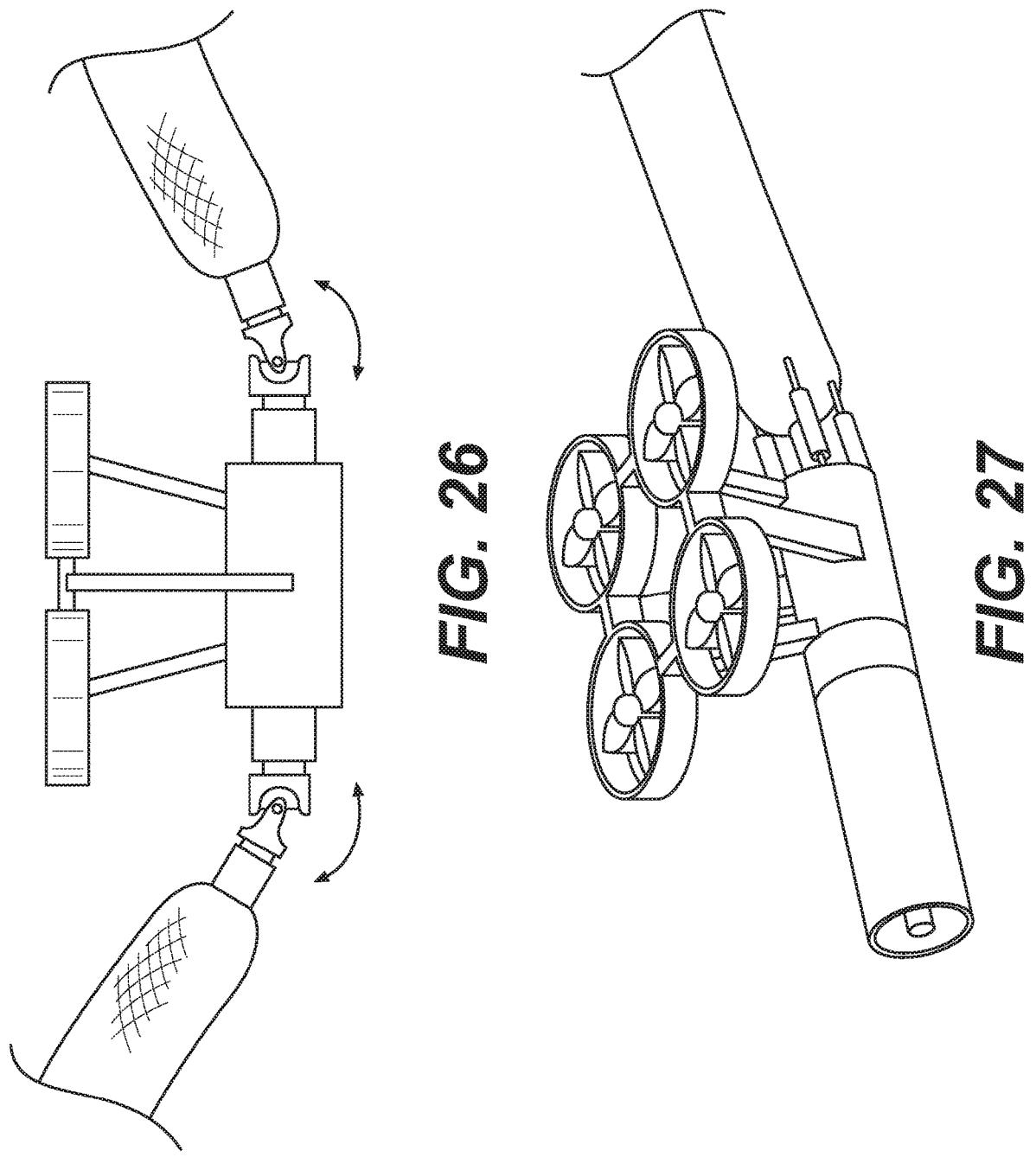
FIGS. 26-29 are schematic diagrams of the various con-
figurations of the hydraulic connection between the aerial
vehicle and the aerial beams.
Figures 28, 29:
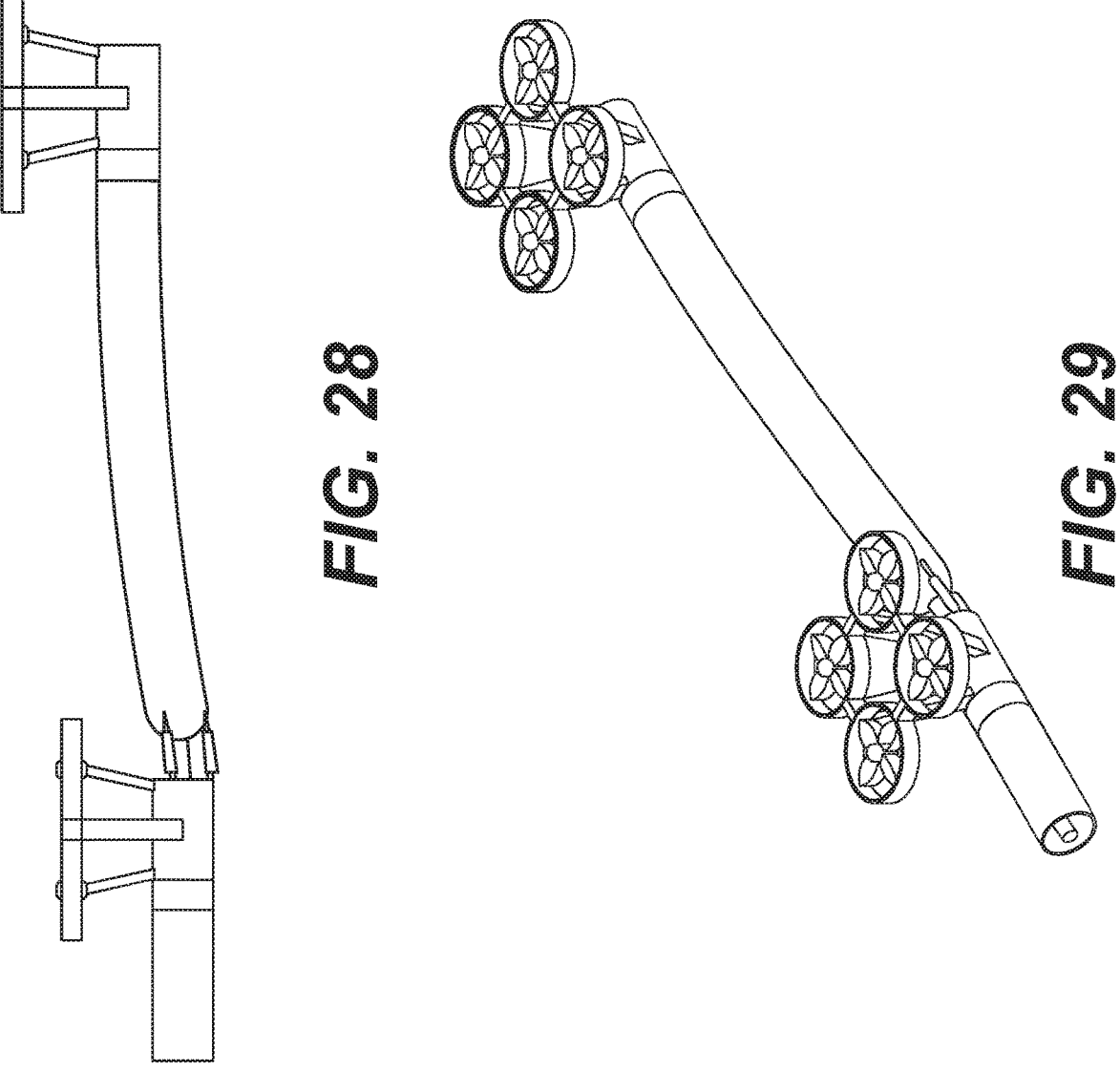

FIGS. 26-29 schematically illustrates embodiments of the present invention that include a ball and socket connection as seen in FIG. 26 and hydraulic connection as seen in FIG. 27. FIG. 28 illustrates an embodiment that includes a fixed connection at one end of the aerial beam system and fixed hydraulic connection at the other end of the aerial beam system. FIG. 29 provides a top view of the embodiment of FIG. 28 illustrating that the fluid dispenser is within the aerial beam. The hydraulic actuators may be controlled by the remote-control system. The control of the hydraulic actuators provides for maneuverability between connection structure of the aerial vehicle and the aerial beam.

In one embodiment of the present invention, an inflatable beam system comprises an inflatable beam that includes a coupling structure connected to at least one of the inflatable beam or an aerial vehicle. The coupling structure may be removably connected to one of the inflatable beam or the aerial vehicle. The beam system also may include a control system configured to receive control signals from a remote control. The control system may be located on either of the inflatable beam or the aerial vehicle. The control system may be configured to operate the flight of the aerial vehicle and to position the inflatable beam with respect to a target surface, as well as inflate the aerial beam. In additional embodiments, the control system may be configured to deflate the inflatable beam. The beam system also includes a fluid dispenser coupled to the aerial beam. The fluid dispenser may be a hose attached to or removably attached to the inflatable beam which contains fluid. The fluid dispenser may also include a nozzle configured to distribute the fluid towards a target surface.

In another embodiment of the present invention, the inflatable beam system comprises an inflatable beam configured to be coupled to a fluid dispenser, wherein the fluid dispenser is configured to disperse the fluid toward a target surface. The inflatable beam system may further include a control system configured to control the distribution of the fluid with respect to the target surface and to cause the inflatable beam to deflate. The inflatable beam can be configured to be substantially rigid when inflated. The inflatable beam can also be configured to be coupled to at least one coupling structure having a moveable joint to allow adjustment of the inflatable beam's position. The movable joint's movement may be adjusted through the inflatable beam system's control system.

In still another embodiment, the inflatable beam system comprises an inflatable beam configured to be coupled to a fluid dispenser that permits the distribution of a fluid toward a target surface, wherein a first end of the inflatable beam is configured to be connected to a first coupling structure and a second end of the inflatable beam is configured to be coupled to a second coupling structure.

In a further embodiment of the present invention, the inflatable beam system comprises an inflatable beam configured to be coupled to a power dispenser for distributing power toward a target surface.

The present invention is also directed to an inflatable beam system comprising an inflatable beam configured to be coupled to a fluid dispenser for distributing the fluid from the beam toward a target surface.

In one embodiment; the inflatable beam system comprises an aerial vehicle with a control system, wherein the aerial vehicle is removably connected to an inflatable beam. The inflatable beam is configured to be coupled to a fluid dispenser for distributing the fluid toward a target surface.

In another embodiment, the inflatable beam system comprises an aerial vehicle including a control system and a coupling structure, wherein the coupling structure is configured to connect the aerial vehicle to at least one inflatable beam. The control system is also configured to receive control signal's to operate of a flight of the aerial vehicle and to position the at least one inflatable beam. The at least one inflatable beam is configured to be inflatable and to be coupled to a fluid dispenser. The fluid dispenser is configured to distribute a fluid over a target surface. The control system can be configured to control the distribution of the fluid toward the target surface. The inflatable beam can be configured to be substantially rigid upon inflation and can also be configured to deflate via the control system. The inflatable beam system may further comprise a coupling structure further including a moveable joint, the moveable joint configured to adjust the position of the inflatable beam; and the control system further configured to control the movement of the moveable joint separate from the flight of the aerial vehicle.

The present invention is also directed to an inflatable beam system comprising a first aerial vehicle and a second aerial vehicle, the first aerial vehicle including a first coupling structure and the second aerial vehicle including a second coupling structure. The inflatable beam has a first end and a second end, wherein the first end of the inflatable beam configured to be coupled to the first aerial vehicle by the first coupling structure and the second end of the aerial beam coupled to the second aerial vehicle by the second coupling structure.

Another embodiment of the present invention comprises an inflatable beam system, wherein the system provides fluid to a target surface utilizing at least one aerial vehicle configured to be coupled to at least one inflatable beam. The inflatable beam system comprises a docking station that includes power and fluid and to which the aerial vehicle is configured for coupling. The aerial vehicle includes a control system and a coupling structure the coupling structure being configured to couple the aerial vehicle with the inflatable beam. The control system includes a remote control to control the flight of the vehicle and the position of the inflatable beam with respect to the target surface. The inflatable beam is configured to be inflated and is coupled with the fluid source. The power is adapted to be coupled to a power dispenser and a fluid dispenser that includes a nozzle adapted for distributing fluid to the target surface.

in another embodiment, an inflatable beam system provides fluid to a target surface utilizing at least one aerial vehicle configured to be coupled to at least one beam, the system comprising: a docking station; the aerial vehicle configured to be coupled to the docking station, the aerial vehicle including a control system; the beam coupled with a fluid and configured to be coupled to a fluid dispenser; and the fluid dispenser configured to distribute fluid to the target surface.

In still another embodiment of the present invention, an inflatable beam system provides power to a target that includes at least one aerial vehicle configured to be coupled to at least one inflatable beam. The system comprises a docking station; the aerial vehicle including a control system and configured to be coupled to the docking station; and the inflatable beam coupled with a power dispenser.

The inflatable beam of the inflatable beam system can be configured to be inflated, become rigid upon inflation, or deflated via a remote-control system. The spacing and maneuverability of the inflatable beam can be configured to be controlled by the control system. The inflatable beam is detachable from the aerial vehicles for example, from the coupling structure of an aerial vehicle. The inflatable beam can be configured to assume various shapes when inflated, including a substantially linear or a curved-shape such as arc or S-shape.

The control system of the inflatable beam system is configurable to permit the control of the distribution of the fluid with respect to the target surface, as well as the control of the movement of the moveable joint or connector. The control system of the inflatable beam system includes at least one of the following types of control system: a remote-control system, manual control system, an electronic control system, a computer control system, and an automatic control system. The control system is configured to transmit or receive signals using wired or wireless means, or both, e.g., Wi-Fi, Bluetooth, Fios, or a telephone network.

The control system may include at least one of a navigation system such as a satellite navigation system (e.g., Global Positioning System) or an inertial navigation system; an imaging system (e.g., a video or camera array or thermal-imaging camera), a thermal sensor (non-contact temperature sensors such as pyrometers, e.g., total radiation pyrometer, distribution pyrometer, spectral pyrometer, disappearing filament pyrometer), or acoustic-based heat sensors; and a sensor array for determining position, velocity, and orientation such as motion sensors (accelerometers), rotation sensors (gyroscopes), or magnetic sensors (magnetometers).

The coupling structure of the at least one aerial vehicle is adapted to connect one aerial vehicle to another aerial vehicle. The coupling structure may include a moveable joint configured to adjust the position of the inflatable beam. The inflatable beam system may include two or more coupling structures. An inflatable beam can be configured to be connected to two aerial vehicles via the coupling structures via a first connection :pint affixed to the first coupling structure of a first aerial vehicle and a second connection joint coupled to a second coupling structure of a second aerial vehicle.

The coupling structures are also adapted to connect the inflatable beams to the aerial vehicles using one or more types of joints and connectors, e.g., hydraulic actuators, accordion-like connectors, and U-joint connectors such as ball and socket, cross and bearing and pin and block. The coupling structure connection may assume any shape, including an S-shape, a U-shape, and a V-shape.

The aerial vehicle of the inflatable beam system can be a UAV and may include an airbag adapted for landing the aerial vehicle. The aerial vehicle can also include a control system configured to control the delivery of the fluid over a target surface. The aerial vehicles can be configured to vertically or horizontally stack on a remote docking station.

The docking station of the inflatable beam system can be configured to dock the aerial vehicles; and the aerial vehicles including a docking connection on the coupling structure of the aerial vehicles. The docking station can be one or a combination of a stationary building, a mobile vehicle or another aerial vehicle. The docking station may be configured for docking at least one aerial vehicle having a docking connection on the aerial vehicle's coupling structure. The docking station may be configured to allow multiple aerial vehicles to vertically stack unto the remote docking station.

What is claimed is:

1. An inflatable beam system comprising:
an inflatable sleeve having a first end and a second end, the inflatable sleeve coupled to a first unmanned aerial vehicle at the first end, a second unmanned aerial vehicle at the second end, and to a fluid dispenser so that the inflatable sleeve extends between the first unmanned aerial vehicle and the second unmanned aerial vehicle, the inflatable sleeve further configured to transition from a deflated state to an inflated state;
a fluid source in communication with the fluid dispenser by a fluid conduit extending along the inflatable sleeve wherein the first unmanned aerial vehicle and the second unmanned aerial vehicle are configured to support the inflatable sleeve;
a power system configured to deliver energy along the inflatable sleeve to the first unmanned aerial vehicle and the second unmanned aerial vehicle; and
wherein the inflatable sleeve serves as a support structure for the fluid conduit and the fluid dispenser;
wherein the inflatable sleeve is configured to be inflated to a partially inflated state between the deflated state and a fully inflated state to selectively adjust the rigidity of the inflatable sleeve, and wherein the rigidity of the inflatable sleeve determines a bendability of the inflatable sleeve so that the inflatable sleeve is more bendable at the partially inflated state than in the fully inflated state and more bendable at the deflated state than in the partially inflated state; and
wherein the fluid dispenser is configured to distribute a fluid toward a target surface.

2. The inflatable beam system of claim 1, further comprising a control system configured to control the distribution of the fluid toward the target surface.

3. The inflatable beam system of claim 1, the inflatable sleeve configured to increase in rigidity when transitioned from the deflated state to the inflated state.

4. The inflatable beam system of claim 1, further comprising a control system configured to deflate the inflatable sleeve.

5. The inflatable beam system of claim 1, further comprising:

a coupling structure coupled to the inflatable sleeve and to the first unmanned aerial vehicle, the coupling structure including a moveable joint; and the moveable joint configured to pivot the inflatable sleeve relative to the first unmanned aerial vehicle.

6. The inflatable beam system of claim 1, further comprising:

a first coupling structure and a second coupling structure; and the first end of the inflatable sleeve connected to the first unmanned aerial vehicle via the first coupling structure and the second end of the inflatable sleeve coupled to the second unmanned aerial vehicle via the second coupling structure.

7. The inflatable beam system of claim 6, additionally comprising a third coupling structure and a second inflatable sleeve, a first end of the second inflatable sleeve connected to the second coupling structure and a second end of the second inflatable sleeve connected to the third coupling structure, wherein the first unmanned aerial vehicle is attached to the first coupling structure, the second unmanned aerial vehicle is attached to the second coupling structure, and a third unmanned aerial vehicle is attached to the third coupling structure, and wherein the first and second inflatable sleeves are configured so that a first flexibility of the first inflatable sleeve can be adjusted independent of a second flexibility of the second inflatable sleeve.

8. The inflatable beam system of claim 1, wherein the fluid source is located on the ground, and wherein a first input end of the fluid dispenser is in fluid communication with the fluid source on the ground.

9. The inflatable beam system of claim 8, wherein the fluid source is an in-ground source of water.

10. The inflatable beam system of claim 8, wherein the fluid source comprises a reservoir of fluid.

11. The inflatable beam system of claim 8, further comprising a pump configured to transfer water from the fluid source to the fluid dispenser.

12. The inflatable beam system of claim 1, wherein the power system comprises an electrical conductor disposed within and supported by the inflatable sleeve, and the electrical conductor is configured to deliver electricity from a power source to the aerial vehicle.

13. The inflatable beam system of claim 12, wherein the power source is ground-based and the electrical conductor extends from the ground-based power source to the aerial vehicle.

14. The inflatable beam system of claim 1, wherein the inflatable sleeve is formed of a braided material.

15. The inflatable beam system of claim 1, wherein the fluid source is ground-based and the fluid conduit extends from the ground-based fluid source to the fluid dispenser.

16. An inflatable beam system comprising:

an inflatable beam coupled to a first aerial vehicle and a second aerial vehicle and to a power source in a manner so that the inflatable beam is disposed between the first aerial vehicle and the second aerial vehicle, the inflatable beam further configured to transition from a deflated state to a fully inflated state, a partially inflated state being between the deflated state and the inflated state; and a fluid delivery system configured to deliver fluid from a fluid source, through a fluid conduit extending along the inflatable beam to a fluid delivery nozzle;

wherein the power source is configured to distribute power along the inflatable beam toward a target location;

wherein the inflatable beam serves as a support structure for the fluid conduit when in the inflated state; and wherein the inflatable beam is configured with adjustable rigidity between the first aerial vehicle and the second aerial vehicle by varying the degree of inflation so that the inflatable beam is more bendable at the partially inflated state than at the fully inflated state.

17. The inflatable beam system of claim 16, further comprising a control system configured to control the distribution of a fluid toward a target surface.

18. The inflatable beam system of claim 16, the inflatable beam configured to increase in rigidity when transitioned from the deflated state to the inflated state.

19. The inflatable beam system of claim 16, further comprising a control system configured to deflate the inflatable beam.

20. The inflatable beam system of claim 16, further comprising: a first coupling structure and a second coupling structure;

the inflatable beam having a first end and a second end; and the first end of the inflatable beam connected to the first coupling structure and the second end of the inflatable beam coupled to the second coupling structure;

wherein the first coupling structure is also coupled to the first aerial vehicle and is configured so that the inflatable beam is pivotable relative to the first aerial vehicle.

21. The inflatable beam system of claim 16, additionally comprising a second inflatable beam and a third aerial vehicle, the second inflatable beam being disposed between the second aerial vehicle and the third aerial vehicle, wherein the first and second inflatable beams are configured so that a first flexibility of the first inflatable beam can be adjusted independent of a second flexibility of the second inflatable beam.

* * * * *